(12) United States Patent
Yamasaki et al.

(10) Patent No.: US 8,325,581 B2
(45) Date of Patent: Dec. 4, 2012

(54) OPTICAL HEAD AND OPTICAL DISC DEVICE

(75) Inventors: Fumitomo Yamasaki, Nara (JP); Hideki Aikoh, Osaka (JP); Akihiro Arai, Kyoto (JP)

(73) Assignee: Panasonic Corporation, Osaka (JP)

( * ) Notice: Subject to any disclaimer, the term of this patent is extended or adjusted under 35 U.S.C. 154(b) by 443 days.

(21) Appl. No.: 12/293,291

(22) PCT Filed: Mar. 19, 2007

(86) PCT No.: PCT/JP2007/055462
§ 371 (c)(1),
(2), (4) Date: Sep. 17, 2008

(87) PCT Pub. No.: WO2007/119410
PCT Pub. Date: Oct. 25, 2007

(65) Prior Publication Data
US 2009/0046564 A1 Feb. 19, 2009

(30) Foreign Application Priority Data
Mar. 20, 2006 (JP) .................................. 2006-076315

(51) Int. Cl.
*G11B 7/00* (2006.01)
(52) U.S. Cl. ............ 369/112.08; 369/112.23; 369/44.32
(58) Field of Classification Search .................. None
See application file for complete search history.

(56) References Cited

U.S. PATENT DOCUMENTS

| 7,417,938 B2 * | 8/2008 | Nishikawa | 369/112.24 |
| 2002/0012313 A1 | 1/2002 | Kimura | |
| 2002/0135891 A1 | 9/2002 | Kimura | |
| 2003/0072224 A1 * | 4/2003 | Ando | 369/44.26 |
| 2003/0185134 A1 | 10/2003 | Kimura et al. | |
| 2004/0100703 A1 | 5/2004 | Kimura et al. | |
| 2004/0165520 A1 * | 8/2004 | Heor et al. | 369/112.24 |
| 2005/0094536 A1 * | 5/2005 | Kimura | 369/112.05 |
| 2005/0259552 A1 * | 11/2005 | Miura et al. | 369/94 |
| 2005/0276297 A1 | 12/2005 | Nishi et al. | |
| 2005/0281169 A1 * | 12/2005 | Kimura et al. | 369/112.01 |
| 2006/0077794 A1 * | 4/2006 | Katsuma et al. | 369/44.23 |

FOREIGN PATENT DOCUMENTS

| JP | 11-126362 | 5/1999 |
| JP | 11-259906 | 9/1999 |
| JP | 2001-296472 | 10/2001 |
| JP | 2002-197712 | 7/2002 |

(Continued)

OTHER PUBLICATIONS

International Search Report issued May 1, 2007 in the International (PCT) Application of which the present application is the U.S. National Stage.
International Preliminary Report on Patentability issued Oct. 21, 2008 in PCT/JP2007/055462, including Forms PCT/IB/338, PCT/IB/373; and PCT/ISA/237 (in English).

*Primary Examiner* — Joseph Haley
(74) *Attorney, Agent, or Firm* — Wenderoth, Lind & Ponack, L.L.P.

(57) ABSTRACT

An optical head (10) transmits a light beam to an optical disc (30), in which light-transmitting layers largely change in thickness, and includes a degree-of-diversion/convergence enlarging member (20) fixed between a collimating lens (4) and an objective lens (6). The diversion/convergence enlarging member (20) reduces a moving range of the collimating lens (4), and allows the optical head (10) to be miniaturized.

6 Claims, 17 Drawing Sheets

FOREIGN PATENT DOCUMENTS

| | | |
|---|---|---|
| JP | 2004-79146 | 3/2004 |
| JP | 2004-185797 | 7/2004 |
| JP | 2004-247047 | 9/2004 |
| JP | 2005-327394 | 11/2005 |

* cited by examiner

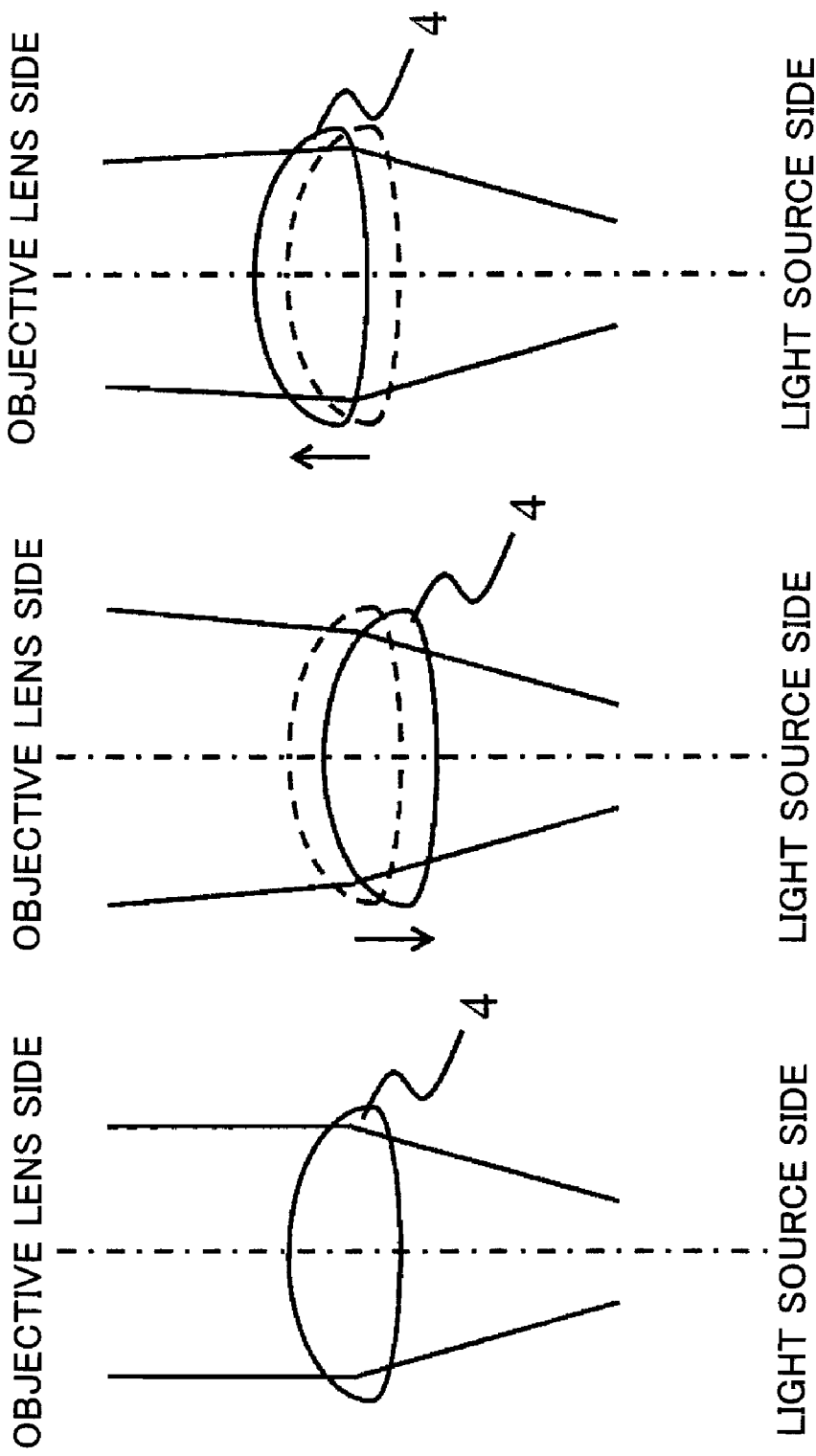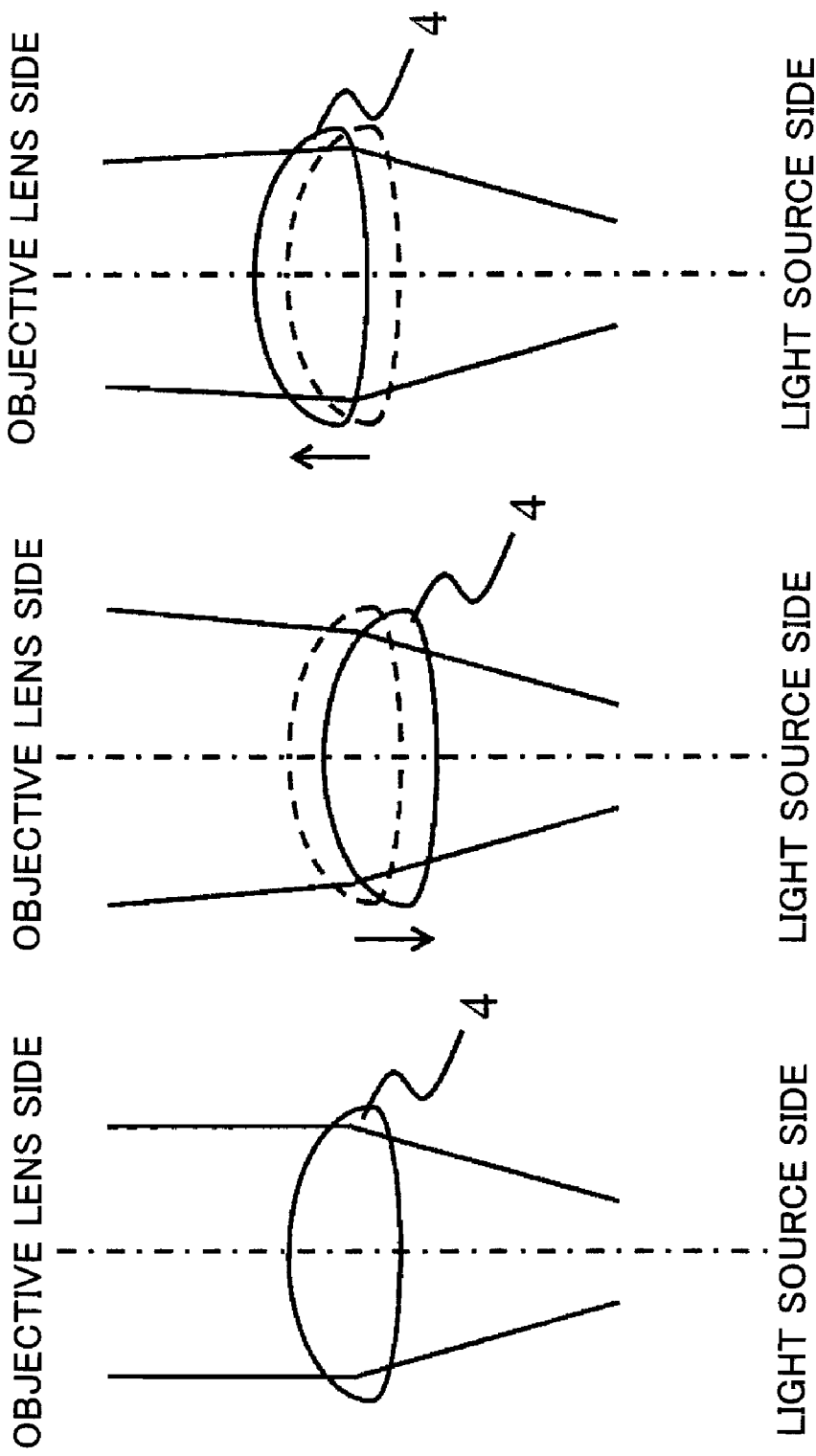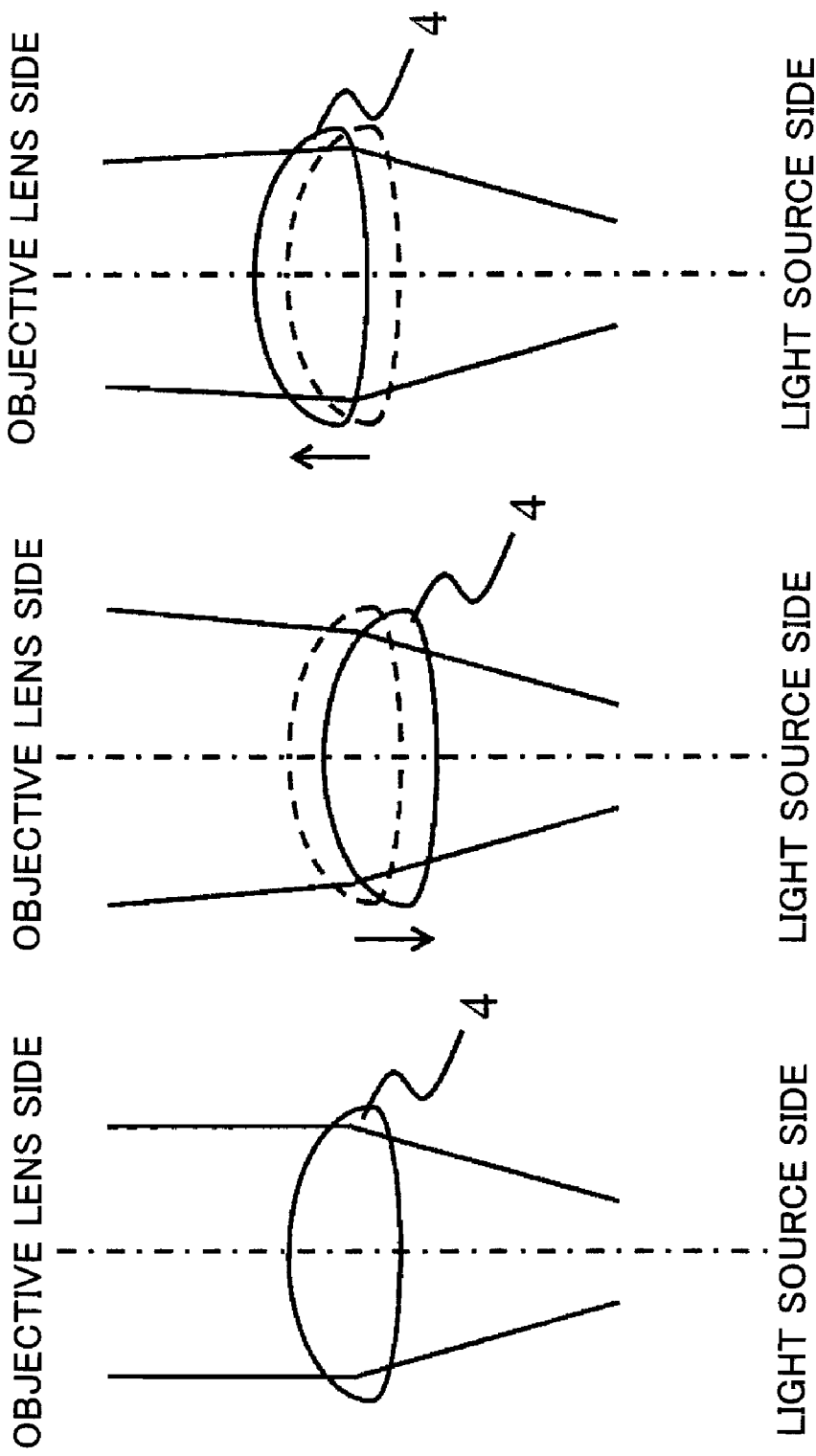

OPTICAL HEAD AND OPTICAL DISC DEVICE

TECHNICAL FIELD

The present invention relates to an optical head used when recording and/or reproducing to an optical information recording medium such as an optical disc, and optical disc device having the optical head.

BACKGROUND ART

In accordance with a large-capacity optical disc, shortening of a wavelength of a light source of an optical head used in recording and/or reproducing on the optical disc and increasing of the NA (Numerical Aperture) of an objective lens progress. However, in accordance with increasing of the NA, an influence of a spherical aberration caused by a change in thickness of a light-transmitting layer becomes conspicuous.

For example, when a wavelength of 650 nm and an objective lens having an NA of 0.60 are used in a DVD, a spherical aberration of about 10 m$\lambda$ is generated with respect to a change of 10 μm in thickness of the light-transmitting layer. On the other hand, when a wavelength of about 400 nm and an objective lens having an NA of about 0.85 are used in a next-generation optical disc, a spherical aberration of about 100 m$\lambda$ is generated with respect to the change of 10 μm in thickness of the light-transmitting layer. For this reason, a means which corrects the spherical aberration is necessary for such optical head for the optical disc.

A Japanese Unexamined Patent Application Publication No. 11-2509906 describes a system of an optical disc device in which a collimating lens is mounted on an actuator for the collimating lens and the collimating lens arranged between a light source and an objective lens is moved so as to cancel a spherical aberration caused by a thickness error of a light-transmitting layer. The optical disc device will be described below with reference to FIG. 18.

FIG. 18 shows a configuration of a conventional optical head. In FIG. 18, reference numeral 101 denotes a light source; 102 denotes a polarizing beam splitter; 103 denotes a ¼ wave plate; 104 denotes a collimating lens; 106 denotes an objective lens; 107 denotes a multi-lens; 108 denotes a light-receiving element; 109 denotes a biaxial actuator which drives the objective lens 106; and 110 denotes a collimating lens actuator which drives the collimating lens 104. These components constitute an optical head 120.

A laser beam emitted from the optical source 101 passes through the polarizing beam splitter 102 and enters into the collimating lens 104. The incident laser beam into the collimating lens 104 is collimated by the collimating lens 104 when a thickness of a light-transmitting layer 131 of an optical disc 130 is a rated value. The collimating lens 104 is mounted on the collimating lens actuator 110, and can be reciprocally moved along the optical axis of the laser beam by this collimating lens actuator.

The laser beam passing through the collimating lens 104 is transformed to a circular polarization state while the laser beam passes through the ¼ wave plate 103 and then enters into the objective lens 106. The laser beam focused by the objective lens 106 and reached on an information recording surface of the optical disc 130 is reflected by the information recording surface and becomes a return beam. The return beam passes along the former optical path and through the objective lens 106, and then enters into the ¼ wave plate 103. The return beam becomes linearly polarized beam rotated at 90° with respect to a polarizing direction of an outward path while passing through the ¼ wave plate 103. Afterward, the return beam is converged by the collimating lens 104 and reflected by the polarizing beam splitter 102. The return beam reflected by the polarizing beam splitter 102 is reached on the light-receiving element 108 through the multi-lens 107 and detected.

When a beam is focused on the information recording surface of the optical disc 130 with the optical head 120 to perform recording/reproducing, main aberrations generated by a thickness error of the light-transmitting layer 131 of the optical disc 130 are caused by defocusing and a spherical aberration. The defocusing can be corrected by a focus servo operation. More specifically, on the basis of the focus serve operation by the light-receiving element 108, the defocusing is corrected by moving the objective lens 106 in the optical axis direction by the biaxial actuator 109, and the beam is focused on the information recording surface.

On the other hand, with respect to the spherical aberration, the laser beam entered into the objective lens 106 is transformed into a diverged beam or converged beam, so that a spherical aberration having polarity opposing that of the spherical aberration generated depending on the thickness of the light-transmitting layer 131 is generated in order to perform correction. More specifically, the collimating lens 104 is moved forward and backward along the optical axis direction by the collimating lens actuator 110, thus the laser beam reached on the objective lens 106 is changed into the diverged beam or converged beam to cause the objective lens 106 to generate the opposite spherical aberration. Therefore, the spherical aberration caused by the thickness error of the light-transmitting layer 131 is canceled. In this manner, in the optical head 120, when the beam is focused on the information recording surface through the objective lens 106, the spherical aberration is canceled out.

As described above, the method of moving the collimating lens along the optical axis direction to change the laser beam being entered on the objective lens into the diverged beam or the converged beam is used in an optical head for a high-density optical such as a BD (Blu-ray Disc). In a BD having two light-transmitting layers 131, a distance between the light-transmitting layers is 30 μm in consideration fluctuation in the thicknesses of the light-transmitting layers at a maximum.

DISCLOSURE OF THE INVENTION

Problems to be Solved by the Invention

In order to further increase the capacity in memory of the optical disc, a multilayered structure including information recording surfaces more than two layers is considered. In this case, it is not practical to form a new information recording surface between two conventional information recording surfaces because various problems are posed due to an excessively small distance between the information recording surfaces. Therefore, in the optical disc having the multilayered structure having information recording surfaces more than two layers, an inter-surface distance between an information recording surface with the thickest light-transmitting layer and an information recording surface with the thinnest light-transmitting layer exceeds the above 30 μm. When the information recording surface is multilayered, information is recorded and/or reproduced on or from the plurality of information recording surfaces. However, since the thicknesses of the light-transmitting layers change depending on the information recording surfaces, on an information recording surface misaligned from an optimum base material thickness (light-transmitting layer thickness having a minimum residual aberration) of an objective lens, a spherical aberration is generated depending on a thickness of the light-transmitting layer from the optimum base material thickness to a predetermined information recording surface.

The spherical aberration increases in proportion to the thickness of the light-transmitting layer from the optimum base material thickness for the objective lens to a predetermined information recording surface. When the information recording surfaces are multilayered to largely change an interval between the light-transmitting layers, third-order spherical aberration to be corrected is also increased. Therefore, in a conventional optical head, in the configuration that the collimating lens is moved along the optical axis direction to try to correct the spherical aberration, a moving range of the collimating lens becomes very large.

For example, it is assumed that a wavelength of a light source $\lambda=408$ nm, an NA of an objective lens=0.85, a focal length of the objective lens is 1.3 mm, a focal length of a collimating lens is 19.0 mm, and an optimum base material thickness (optical disc light-transmitting layer thickness at which the minimum residual aberration is obtained) of the objective lens is 85.5 μm. In this case, when an optical disc having a light-transmitting layer thickness ranging from 50 μm to 125 μm is to be recorded or reproduced, a moving range (direction approaching the objective lens is defined as a positive (+) direction) of the collimating lens is shown in FIG. 19.

According to FIG. 19, when the thickness of the light-transmitting layer changes from 50 μm to 125 μm, the moving range of the collimating lens to correct a spherical aberration is 8 mm or more. In this manner, in the optical head used for an optical disc having the number of information recording surfaces and in which variance in the thickness of the light-transmitting layers is large, in order to secure the moving range of the collimating lens, the size of the optical head must be increased.

The present invention has been made in consideration of the above problem, and has as its object to provide an optical head which further reduces a moving range of a collimating lens even for an optical disc having, for example, a multilayered structure in which light-transmitting layers change in thickness, i.e., an inter-surface distance between an information recording surface with the thickest light-transmitting layer and an information recording surface with a thinnest light-transmitting layer exceeds 30 μm, and an optical disc device including the optical head.

Means for Solving the Problem

An optical head according to a first aspect of the present invention includes: a light source; a coupling lens configured to make a degree of divergence and/or a degree of convergence of a beam emitted from the light source variable; an objective lens configured to focus the beam on an optical information recording medium having at least three information recording surfaces at which light-transmitting layers have different thicknesses; and a degree-of-divergence/convergence enlarging member configured to be fixed between the coupling lens and the objective lens, a diameter D1 of a beam entered into the degree-of-divergence/convergence enlarging member and a diameter D2 of a beam emitted from the degree-of-divergence/convergence enlarging member satisfying the following equation (1):

$$D1 > D2 \tag{1}$$

The optical head according to the first aspect may be designed so that in the plurality of information recording surfaces, an inter-surface distance between the information recording surface of a thickest light-transmitting layer and the information recording surface of a thinnest light-transmitting layer exceeds 30 μm.

In the optical head according to the first aspect of the present invention, the degree-of-divergence/convergence enlarging member may be fixed to a moving part of an actuator which drives the objective lens, and driven integrally with the objective lens.

In the optical head according to the first aspect of the present invention, the degree-of-divergence/convergence enlarging member may be an a focal lens in which the beam emitted from the degree-of-divergence/convergence enlarging member becomes nearly a collimated beam when an incident beam to the degree-of-divergence/convergence enlarging member is nearly collimated beams.

In the optical head according to the first aspect of the present invention, the degree-of-divergence/convergence enlarging member may be a refracting lens which includes a surface facing the coupling lens and having a positive power and a surface facing the objective lens and having a negative power.

The above optical head according to the first aspect of the present invention may be designed so that in the degree-of-divergence/convergence enlarging member, at least one of the surface facing the coupling lens and the surface facing the objective lens has an aspherical shape.

In the optical head according to the first aspect of the present invention, the degree-of-divergence/convergence enlarging member may include a chromatic aberration correcting function configured to correct a chromatic aberration of the objective lens generated in accordance with a fluctuation in wavelength of the light source.

The above optical head according to the first aspect of the present invention may be designed so that in the degree-of-divergence/convergence enlarging member, a surface facing the coupling lens is a diffracting surface having a positive power, and a surface facing the objective lens is a refracting surface having a negative power.

The above optical head according to the first aspect may be designed so that the degree-of-divergence/convergence enlarging member is a refracting lens in which a surface facing the coupling lens is a convex surface and a surface facing the objective lens is a concave surface, and the convex surface or the concave surface has a chromatic aberration correcting function configured to correct a chromatic aberration of the objective lens caused by a fluctuation in wavelength of the light source.

The above optical head according to the first aspect of the present invention may be designed so that the degree-of-divergence/convergence enlarging member is a lens obtained by cementing two lenses to each other, the lens includes a first lens which has a positive power on a surface facing the coupling lens and a second lens which has a negative power on a surface facing the objective lens, and an Abbe number $\nu_1$ of a glass material of the first lens and an Abbe number $\nu_2$ of a glass material of the second lens satisfy the following equation (2):

$$\nu_1 > \nu_2 \tag{2}$$

In the optical head according to the first aspect of the present invention, the Abbe number $\nu_1$ of the glass material of the first lens and the Abbe number $\nu_2$ of the glass material of the second lens may satisfy the following equation (3) and equation (4):

$$v1 \geq 50 \tag{3}$$

and $$v2 \leq 35. \tag{4}$$

The above optical head according to the first aspect of the present invention may be designed so that in the degree-of-divergence/convergence enlarging member, at least one surface of the surface facing the coupling lens, the surface facing the objective lens, and a cemented surface between the two lenses has an aspherical shape.

In the optical head according to the first aspect of the present invention, the diameter D1 of the beam entered into the degree-of-divergence/convergence enlarging member and the diameter D2 of the beam emitted from the degree-of-divergence/convergence enlarging member may satisfy the following equation (5):

$$D1 \times 0.99 \geq D2 \geq D1 \times 0.8. \tag{5}$$

The optical head according to the first aspect of the present invention may further comprise a drive means configured to move the coupling lens in an optical axis direction, and wherein a position of the coupling lens in the optical axis direction may be changed to change a degree of divergence and/or a degree of convergence of a beam emitted from the light source.

The optical head according to the first aspect may further comprise a second light source configured to be disposed independently of the light source, and a second objective lens configured to be arranged to be adjacent to the objective lens and focus a beam emitted from the second light source on a second optical information recording medium different from the optical information recording medium.

The above second objective lens may be fixed to a moving part of an actuator driving the objective lens, and may be driven integrally with the objective lens.

An optical disc device according to a second aspect of the present invention includes: an optical head; an optical disc drive unit configured to rotationally drive an optical disc; and a control unit configured to control the optical head and the optical disc drive unit, and the optical head is an optical head defined in any one of the first aspect.

EFFECT OF THE INVENTION

According to the optical head of the first aspect of the present invention and the optical disc device according to the second aspect, for example, a further compact size can be advantageously realized even in an optical head used for an optical disc having light-transmitting layers which largely change in thickness by multi-layering an information recording surface.

The optical disc device can advantageously further include a chromatic aberration correcting function that corrects a chromatic aberration of an objective lens caused in accordance with a fluctuation in wavelength of the light source.

BRIEF DESCRIPTION OF THE DRAWINGS

FIG. 4A is a diagram showing a state of a beam when the collimating lens included in the optical head shown in FIG. 1 is driven in the optical axis direction;

FIG. 4B is a diagram showing a state of a beam when the collimating lens included in the optical head shown in FIG. 1 is driven in the optical axis direction;

FIG. 4C is a diagram showing a state of a beam when the collimating lens included in the optical head shown in FIG. 1 is driven in the optical axis direction;

REFERENCE NUMERALS

1 Semiconductor laser, 2 Polarizing beam splitter,
3 ¼ wave plate, 4 Collimating lens, 5 Reflecting mirror, 6 Objective lens, 7 Detecting lens,
8 Light-receiving element, 9 Biaxial actuator, 10, 11, 12 Optical head, 16 Stepping motor,
17 Screw shaft, 18 Lens holder, 19 Guide member,
20 Incident angle transforming lens, 21 Incident angle transforming hologram, 22 Incident angle transforming compound lens, 30 Optical disc, 31, 32, 33, 34 Information recording surface, 35 Optical disc drive unit, 36 Control unit, 40 Optical head, 50 Optical disc device,
101 Light source, 102 Polarizing beam splitter,
103 ¼ wave plate, 104 Collimating lens, 106 Objective lens, 107 Multi-lens, 108 Light-receiving element, 109 Biaxial actuator, 110 Collimating lens actuator, 120 Optical head, 130 Optical disc, and 131 Light-transmitting layer.

BEST MODES FOR CARRYING OUT THE INVENTION

An optical head and an optical disc device according to embodiments of the present invention will be described below with reference to the drawings.
(First Embodiment)
A first embodiment of the present invention will be described below with reference to FIGS. 1 to 7.

Figure 1:
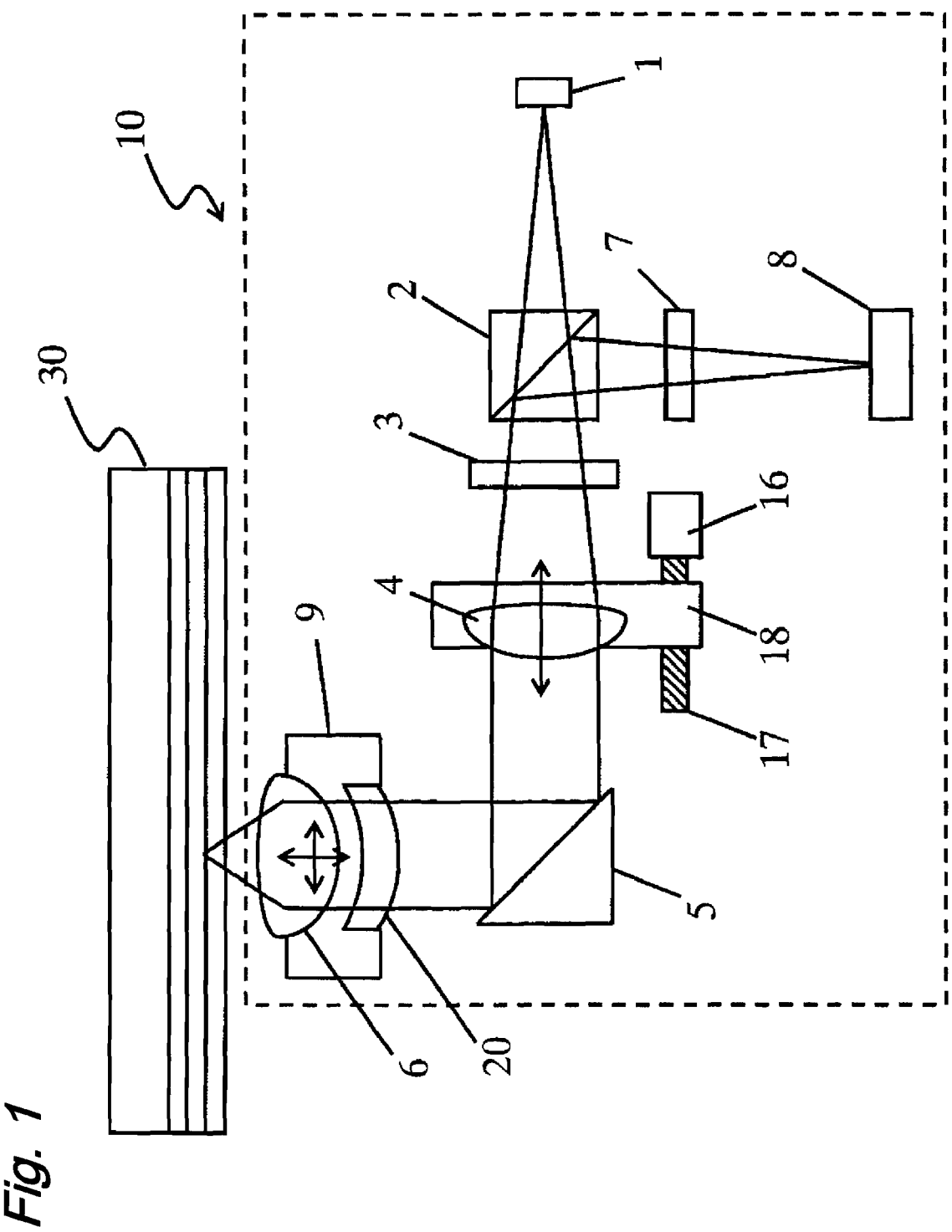
FIG. 1 is a schematic diagram of an optical head according to a first embodiment of the present invention.

FIG. 1 is a schematic diagram of an optical head according to an embodiment of the present invention. In FIG. 1, reference numeral 1 denotes a semiconductor laser corresponding to an example of a light source; 2 denotes a polarizing beam splitter; 3 denotes a ¼ wave plate; 4 denotes a collimating lens corresponding to an example of a coupling lens; 5 denotes a reflecting mirror; 6 denotes an objective lens; 7 denotes a detecting lens; 8 denotes a light-receiving element; 9 denotes a biaxial actuator which drives the objective lens 6; 20 denotes an incident angle transforming lens corresponding to one example of a degree-of-divergence/convergence enlarging member; 16 denotes a stepping motor which drives the collimating lens 4; 17 denotes a screw shaft; 18 denotes a lens holder which holds the collimating lens 4. These components constitute an optical head 10.

Figure 2:
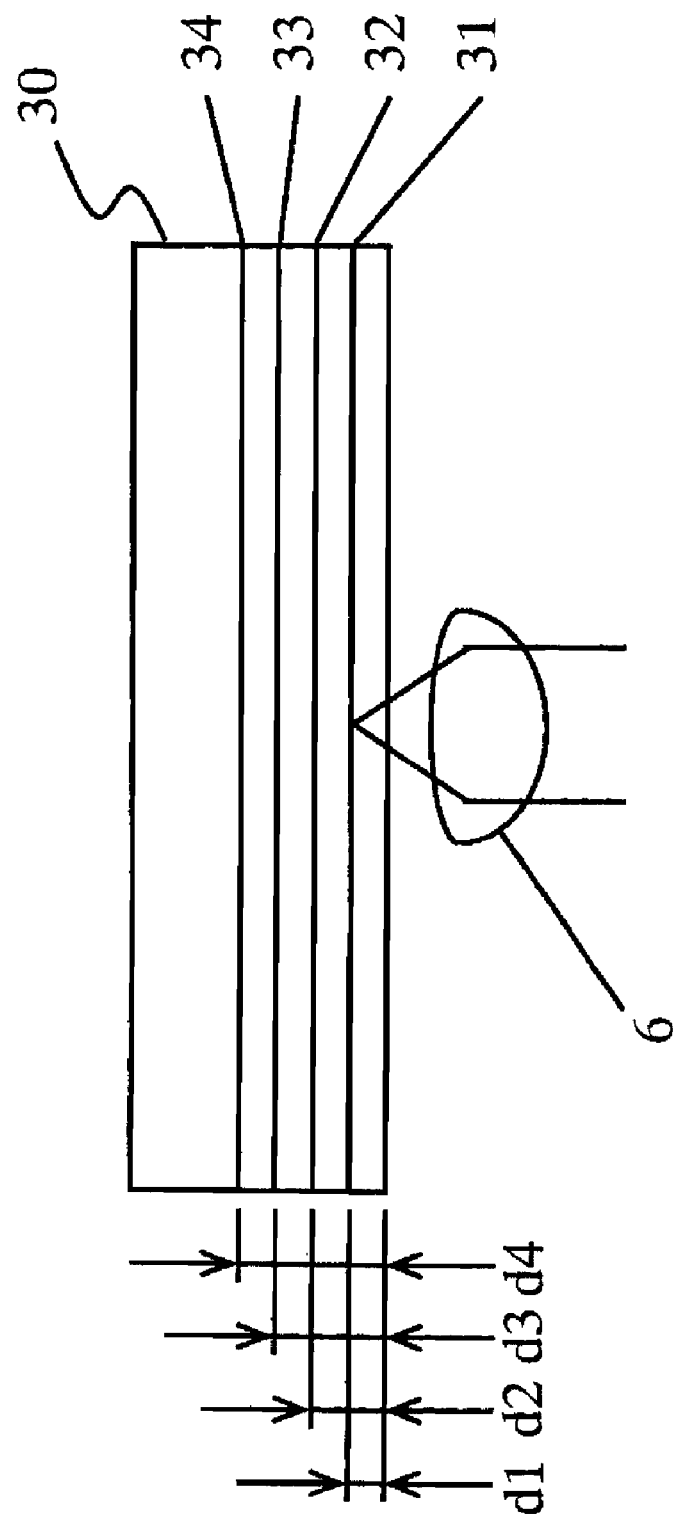
FIG. 2 is a schematic diagram showing a structure of an optical disc on/from which information is recorded or reproduced by the optical head shown in FIG. 1.

Reference numeral 30 denotes an optical disc having a plurality of transparent substrates (light-transmitting layers) and corresponding to an optical information recording medium. The optical disc 30, as shown in FIG. 2, information recording surfaces 31, 32, 33, and 34 are formed from a surface of incidence side (objective lens 6 side), and thicknesses of the light-transmitting layers arranged from the surface of incidence to the information recording surfaces are represented by d1, d2, d3, and d4, respectively. Since the optical disc 30 corresponds to the optical disc having the multilayered structure, an inter-surface distance between the information recording surface 34 with the thickest light-transmitting layer and the information recording surface 31 with the thinnest light-transmitting layer exceeds 30 µm in consideration of a fluctuation. In the embodiment, the optical disc 30 has the four information recording surfaces. However, the optical disc 30 is not limited to this structure, and the optical disc 30 is an optical disc having three or more information recording surfaces.

Next, an operation of the optical head 10 when information is recorded or reproduced on/from the optical disc 30 will be described below in detail. A linearly polarized laser beam emitted from the semiconductor laser 1 passes through the polarizing beam splitter 2 and is transformed into a circularly polarized beam by the ¼ wave plate 3. Thereafter, the circularly polarized beam is transformed into nearly collimated beams by the collimating lens 4 and is reflected by the reflecting mirror 5. Then the beam passes through the incident angle transforming lens 20 and is focused on any one of the information recording surfaces 31, 32, 33, and 34 of the optical disc 30 as an optical spot through the light-transmitting layers by the objective lens 6.

The reflected laser beam reflected by any one of the information recording surfaces 31, 32, 33, and 34 passes through the objective lens 6 again and the incident angle transforming lens 20, is reflected by the reflecting mirror 5, and passes through the collimating lens 4. Then, the reflected beam is transformed into a linearly polarized beam different from that of the outward path by the ¼ wave plate 3. Thereafter, the linearly polarized beam is reflected by the polarizing beam splitter 2 and guided to the light-receiving element 8 by the detecting lens 7. The laser beam detected by the light-receiving element 8 is photo-electrically transformed and then arithmetically processed to generate a focus error signal for tracing the deviation of the optical disc 30 and a tracking error signal for tracing the deflection of the optical disc 30. The biaxial actuator 9 drives the objective lens 6 in a biaxial direction by the focus error signal and the tracking error signal to cause an optical spot to track an information track of the rotating optical disc 30.

The collimating lens 4 is held in the lens holder 18, so that the collimating lens 4 can be moved along the optical axis of the laser beam. In accordance with the thicknesses of the light-transmitting layers of the information recording surfaces 31 to 34, particularly when the thicknesses of the light-transmitting layers are not equal to regulated values, the laser beam being entered into the objective lens 6 through the collimating lens 4 is transformed to a diverged beam or a converged beam, and an opposite spherical aberration is generated by the objective lens 6 so as to correct the spherical aberration in accordance with a change in thickness of each light-transmitting layer. In such manner, the spherical aberration is corrected.

Figure 3B:
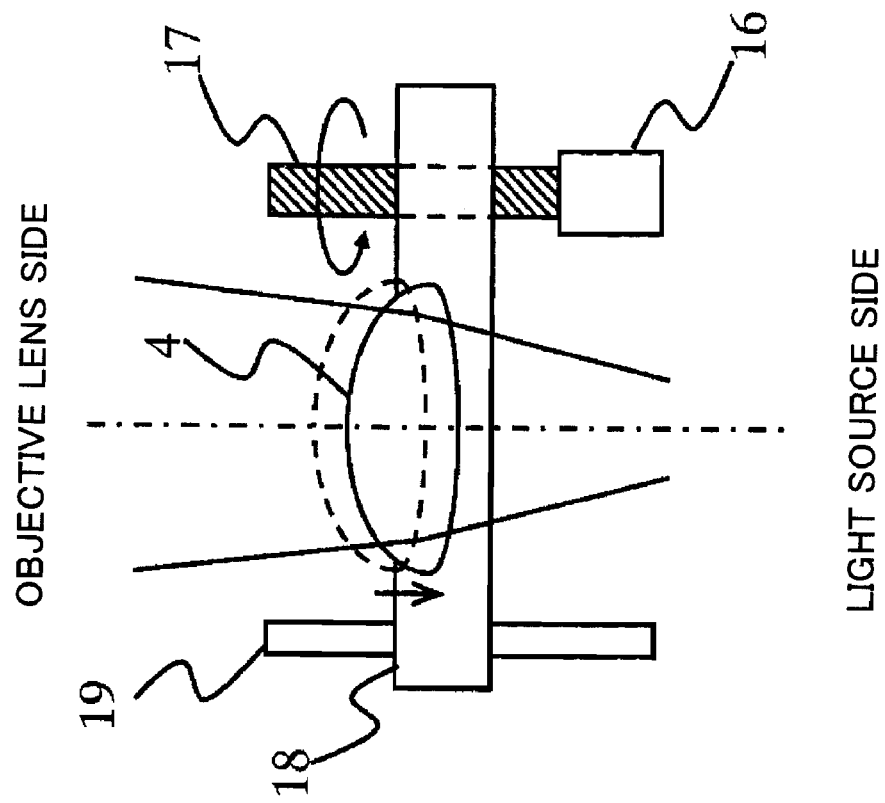
FIG. 3B is a schematic diagram of a mechanism which drives the collimating lens included in the optical head shown in FIG. 1 in the optical axis direction.
Figure 3A:
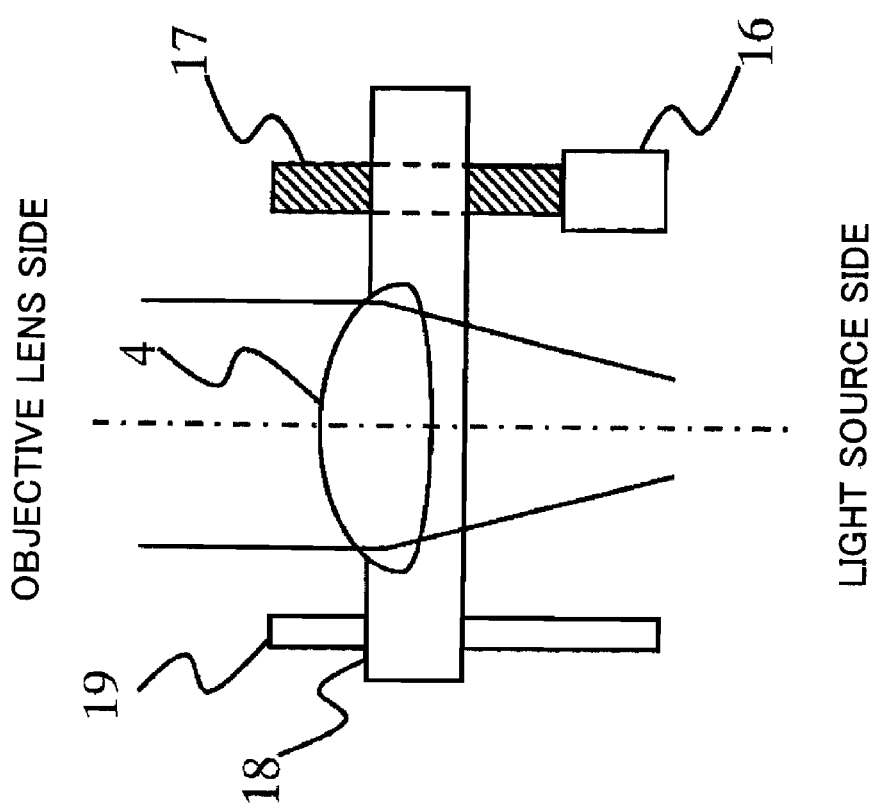
FIG. 3A is a schematic diagram of a mechanism which drives a collimating lens included in the optical head shown in FIG. 1 in an optical axis direction.

FIGS. 3A and 3B are schematic diagrams of a mechanism which drives the collimating lens 4 in the optical axis direction. In FIGS. 3A and 3B, reference numeral 16 denotes a stepping motor; 17 denotes a screw shaft; 18 denotes a lens holder; and 19 denotes a guide member. As shown in FIG. 3B, the stepping motor 16 is driven to rotate the screw shaft 17, so that the collimating lens 4 and the lens holder 18 which holds the collimating lens 4 can be moved in the optical axis direction of the collimating lens 4 along the guide member 19.

FIGS. 4A to 4C are diagrams showing states of beams when the collimating lens 4 is driven in the optical axis direction. The spherical aberrations generated by differences between the thicknesses of the light-transmitting layers in the optical disc 30 can be corrected by changing degrees of divergence/convergence of the laser beam being entered into the objective lens 6 and generating spherical aberrations having polarity opposing those of the spherical aberrations generated by the difference between the thicknesses of the light-transmitting layers.

Therefore, for example, FIG. 4A is used as the base, which shows that an emitted beam from the collimating lens 4 changes into nearly collimated beams; as shown in FIG. 4B, by moving the collimating lens 4 toward the light source side, the emitted beam from the collimating lens 4 changes into a diverged beam, so that a spherical aberration generated by a case the light-transmitting layer in the optical disc 30 corresponds to being thick can be corrected. On the other hand, as shown in FIG. 4C, when the collimating lens 4 is moved toward the objective lens 6 side, the emitted beam from the collimating lens 4 changes into a converged beam, so that a spherical aberration generated by a case the light-transmitting layer in the optical disc 30 corresponds to being thin can be corrected.

In this case, as a means for moving the collimating lens 4 in the optical axis direction, not only a structure of using the stepping motor 16 described above, but also any means such as an actuator driven by a magnetic circuit or a piezoelectric element can be used. The means is not limited to the above structure.

When the stepping motor is used, a position of the collimating lens in the optical axis direction need not be monitored. For this reason, the system can be advantageously simplified. Also, since the actuator driven by the magnetic circuit or the piezoelectric element has a small driving part, the system is advantageously suitable for miniaturization of the optical head.

Figure 5:
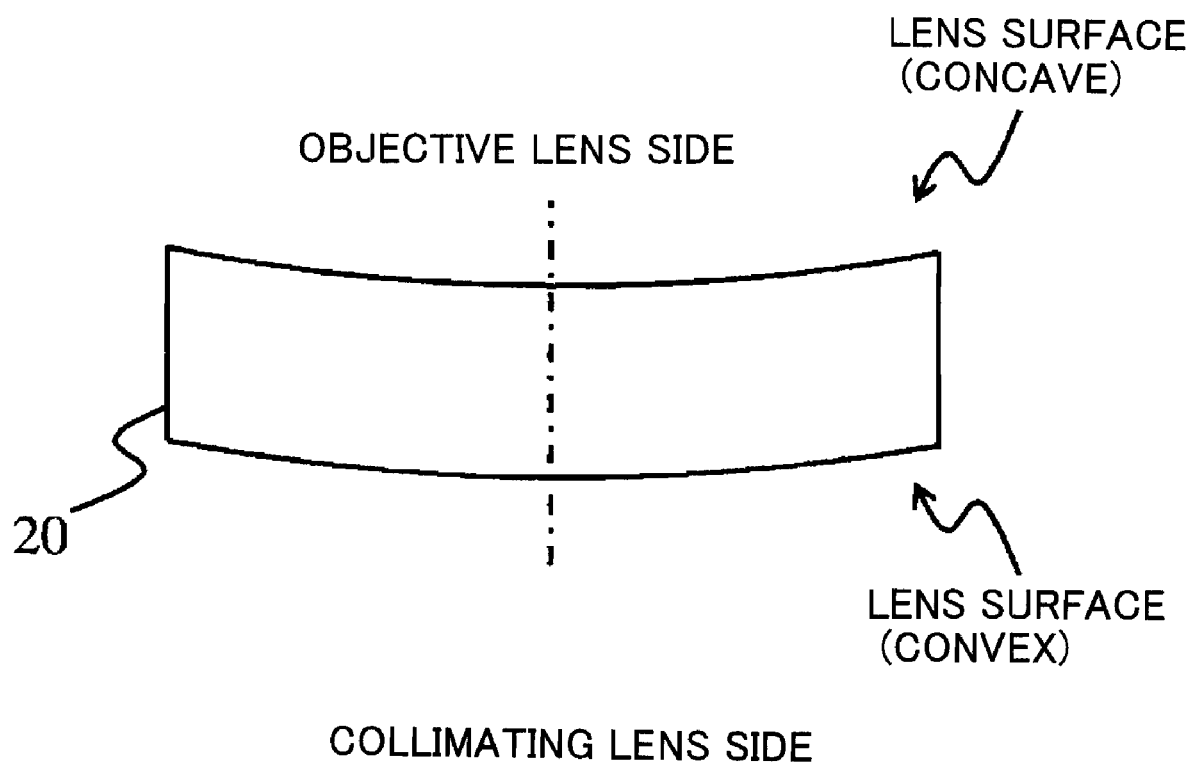
FIG. 5 is a schematic diagram showing a structure of an incident angle transforming lens included in the optical head shown in FIG. 1.
Figure 6:
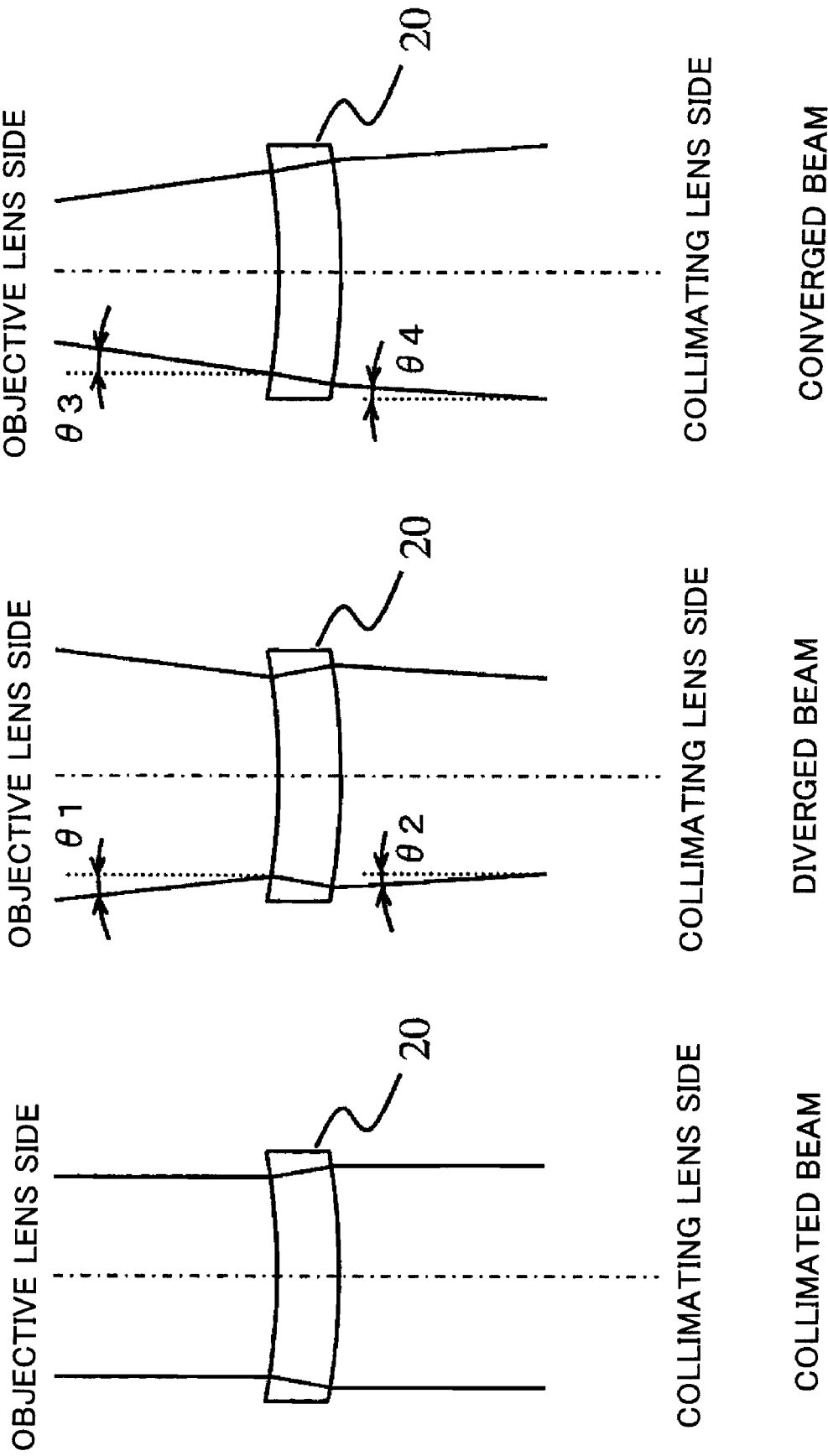
FIG. 6A is a diagram showing a state of a beam emitted from the incident angle transforming lens included in the optical head shown in FIG. 1.
FIG. 6B is a diagram showing a state of a beam emitted from the incident angle transforming lens included in the optical head shown in FIG. 1.
FIG. 6C is a diagram showing a state of a beam emitted from the incident angle transforming lens included in the optical head shown in FIG. 1.

A function of the incident angle transforming lens 20 will be described below in detail. As shown in FIG. 5, the incident angle transforming lens 20 functions as a so-called afocal lens in which a surface (first surface) arranged at the collimating lens 4 side has a convex power, a surface (second surface) facing on the objective lens 6 has a concave power, and collimated beam having a beam diameter different from that of an incident beam is emitted when the collimated beam is entered therein. It also can be expressed by another method that the incident angle transforming lens 20 functions as the afocal lens. Namely, wherein a diameter of a beam entered into the incident angle transforming lens 20 is D1 and a diameter of a beam emitted from the incident angle transforming lens 20 is D2, it can be said that a relationship given by D1>D2 is satisfied.

Specifications of the incident angle transforming lens according to the embodiment are described in "Table 1".

TABLE 1

Specifications of Incident angle transforming lens

| Material name | ZEONEX330R |
| --- | --- |
| Refractive index (408 nm) | 1.5229 |
| Thickness | 1.5 mm |

| | First surface | Second surface |
| --- | --- | --- |
| Radius of curvature R | 8.8481 | 8.3228 |
| Conic constant k | −0.5376 | −0.6835 |

Since the incident angle transforming lens 20 can reduce a spherical aberration generated by the incident angle transforming lens itself, as described in the above specifications, it is preferable that at least one of the surface of incidence (first surface) and the emitting surface (second surface) has an aspherical shape.

The function of the incident angle transforming lens 20 will be described below with reference to FIGS. 6A to 6C.

FIGS. 6A to 6C are diagrams showing states of emitted beams when a collimated beam, a diverged beam, and a converged beam are entered into the incident angle transforming lens 20. The incident angle transforming lens 20 emits a collimated beam having a beam diameter different from that of an incident beam as shown in FIG. 6A when the collimated beam is entered therein.

However, as shown in FIG. 6B, when the diverged beam is entered into the incident angle transforming lens 20, an inclination angle θ1 between a marginal ray of a diverged beam emitted from the lens 20 and the optical axis is larger than an inclination angle θ2 between a marginal ray of an incident diverged beam to the lens 20 and the optical axis. On the other hand, as shown in FIG. 6C, when a converged beam is entered into the incident angle transforming lens 20, an inclination angle θ3 between a marginal ray of a converged beam emitted from the lens 20 and the optical axis is larger than an inclination angle θ4 between a marginal ray of an incident converged beam to the lens 20 and the optical axis.

More specifically, when the collimated beam is entered into the incident angle transforming lens 20, the lens 20 emits the collimated beam having an emitted beam diameter different from an incident beam diameter. When the diverged beam is entered into the incident angle transforming lens 20, the lens 20 further diverges the incident diverged beam to emit the beam as a diverged beam. When the converged beam is entered into the incident angle transforming lens 20, the lens 20 further converges the incident converged beam to emit the beam as a converged beam. In this manner, the incident angle transforming lens 20 has a function further enlarging degrees of divergence/convergence of the incident beam to emit the beam.

On the other hand, the collimating lens 4 is moved in the optical axis direction to make it possible to cause the diverged beam, the collimated beams, and the converged beam to enter into the incident angle transforming lens 20. The objective lens 6 has the following characteristics. That is, with reference to a case in which the collimated beam is entered into the objective lens 6, when the diverged beam is entered into the objective lens 6, the objective lens 6 obtains a focus on a further position. In contrast to this, when the converged beam is entered into the objective lens 6, the objective lens 6 obtains a focus on a closer position.

Therefore, as described above, the incident angle transforming lens 20 having the function that enlarges the degrees of divergence/convergence of the incident beam is arranged on the incident side of the objective lens 6, the diverged beam and the converged beam formed by moving the collimating lens 4 are further diverged or converged to enter into the objective lens 6. Therefore, even though a moving distance of the collimating lens 4 is equal to that of a related art, afocal length of the objective lens 6 can be largely changed. More specifically, when a distance between information recording surfaces in the optical disc is equal to that in the related art, according to the embodiment, it is understood that the moving distance of the collimating lens 4 can be made smaller than that of the related art.

Figure 7:
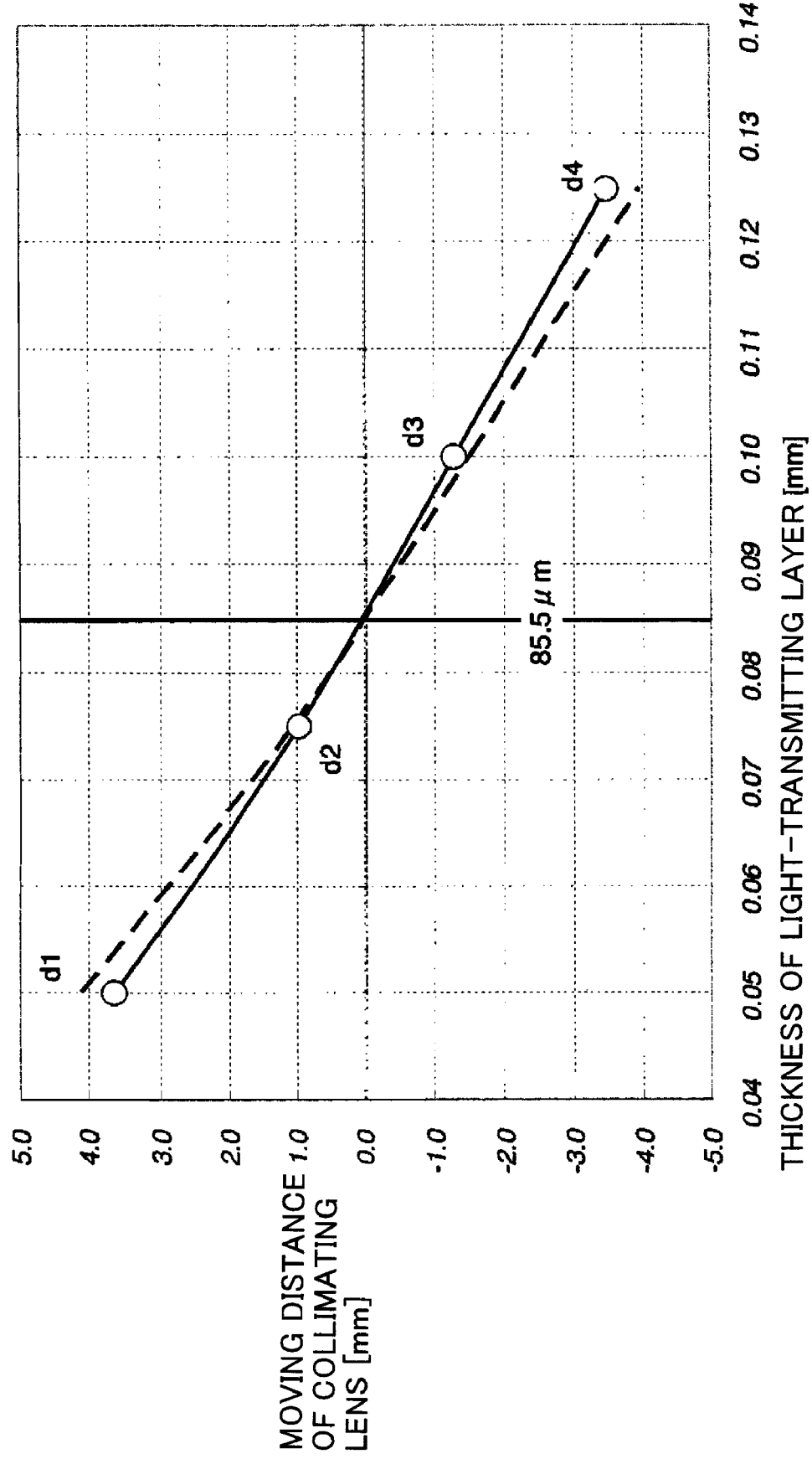
FIG. 7 is a graph showing a relationship between a thickness of a light-transmitting layer and a moving distance of a collimating lens in the optical head shown in FIG. 1.

FIG. 7 is a result obtained by calculating a relationship between the thickness of a light-transmitting layer to be corrected and a moving distance of the collimating lens. The thicknesses of the light-transmitting layer to be corrected are indicated on the horizontal axis of the graph, and the vertical axis of the graph indicates the moving distance of the collimating lens 4. Concrete numbers of parameters used in the calculation are as follows.

Wavelength of semiconductor laser 1 λ408 nm
NA of objective lens 6 NA=0.85
Focal length of objective lens 6 fol=1.3 mm
Focal length of collimating lens 4 fcl=19.0 mm Thickness of each light-transmitting layer between information recording surfaces:

d1=50 μm;
d2=75 μm;
d3=100 μm; and
d4=125 μm.

In the moving distance of the collimating lens 4, a direction toward the objective lens is defined as a positive (+) with reference to a case in which an optimum base material thickness (thickness of an optical disc light-transmitting layer having a minimum residual aberration) of the objective lens 6 is 85.5 μm.

According to FIG. 7, the collimating lens 4 according to the embodiment needs a moving distance of +3.65 mm to correct the thickness d1 of the light-transmitting layer of the optical disc 30. The collimating lens 4 according to the embodiment needs a moving distance of −3.47 mm to correct the thickness d4 of the light-transmitting layer. More specifically, it is understood that the moving range of the collimating lens 4 is about 7.1 mm, which is smaller than that of a related art indicated by a dotted line by about 1 mm. This expresses that a spherical aberration generated per unit moving distance of the collimating lens 4 is increased because the incident angle transforming lens 20 increases degrees of divergence/convergence of a beam entered into the objective lens 6.

In order to further reduce the size of the optical head 10, as shown in FIG. 1, the incident angle transforming lens 20 is preferably mounted on the biaxial actuator 9 which drives the objective lens 6. Since the incident angle transforming lens 20 is an afocal lens, a coma aberration caused by misalignment of an optical axis with respect to the objective lens 6 is rarely generated. It is preferable since positional adjustment is easily performed when the incident angle transforming lens 20 is mounted on the biaxial actuator 9.

As described above, since the optical head 10 according to the embodiment includes the incident angle transforming lens 20, the movable range of the collimating lens 4 can be reduced, and the optical head having a compact size can be realized.

(Second Embodiment)

Another embodiment of the present invention will be described below with reference to FIGS. 8 and 9. The same reference numerals as in the first embodiment denote the same constituent elements in the second embodiment, a description thereof will be omitted.

Figure 8:
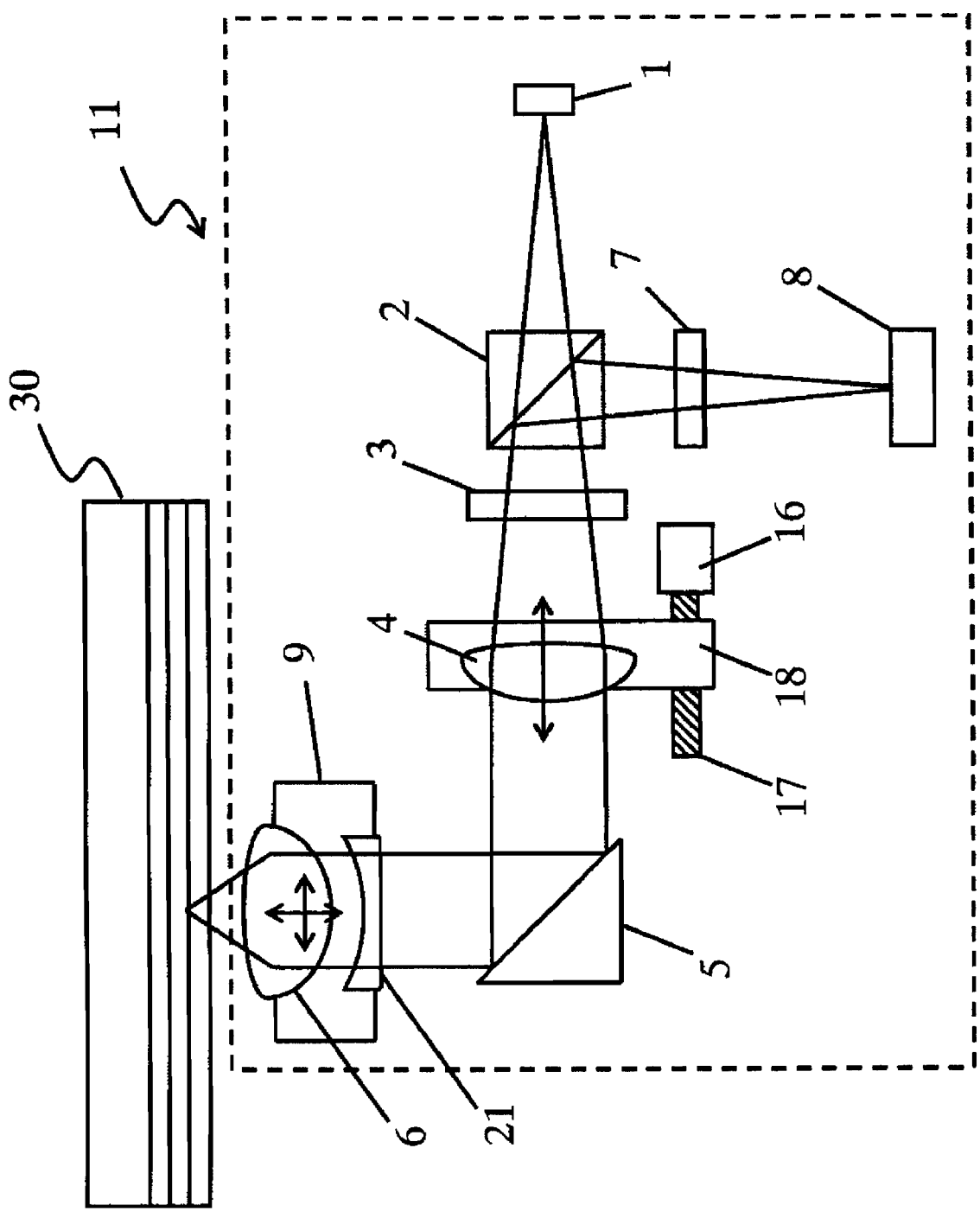
FIG. 8 is a schematic diagram of an optical head according to a second embodiment of the present invention.
Figure 9:
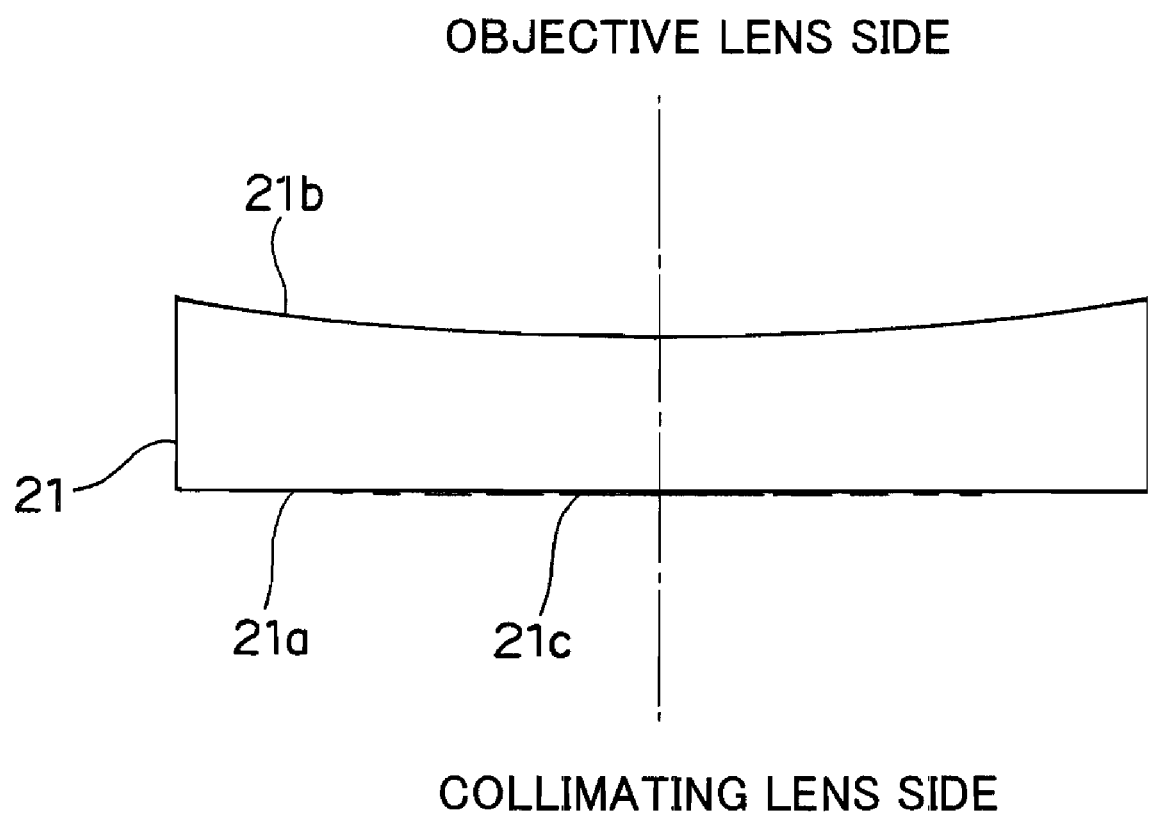
FIG. 9 is a schematic diagram showing a structure of an incident angle transforming hologram in the optical head shown in FIG. 8.

FIG. 8 is a schematic diagram of an optical head according to another embodiment of the present invention. In FIG. 8, reference numeral 1 denotes the semiconductor laser corresponding to an example of a light source; 2 denotes the polarizing beam splitter; 3 denotes the ¼ wave plate; 4 denotes the collimating lens corresponding to an example of a coupling lens; 5 denotes the reflecting mirror; 6 denotes the objective lens; 7 denotes the detecting lens; 8 denotes the light-receiving element; 9 denotes the biaxial actuator which drives the objective lens 6; 21 denotes an incident angle transforming hologram 21 corresponding to an example of a degree-of-divergence/convergence enlarging member; 16 denotes the stepping motor which drives the collimating lens 4; 17 denotes the screw shaft; 18 denotes the lens holder which holds the collimating lens 4. These components constitute an optical head 11. Reference numeral 30 denotes the optical disc having a plurality of transparent substrates (light-transmitting layers) and corresponding to the optical information recording medium. In the optical disc, an inter-surface distance between the information recording surface 34 of the thickest light-transmitting layer and the information recording surface 31 of the thinnest light-transmitting layer exceeds 30 μm mentioned before.

Since an operation of the optical head 11 when information is recorded on or reproduced from the optical disc 30 is the same as the operation of the optical head 10 described in the first embodiment, a detailed description thereof will be omitted.

A difference between the optical head 10 according to the first embodiment and the optical head 11 according to the present embodiment is a difference between the incident angle transforming lens 20 and the incident angle transforming hologram 21. In the incident angle transforming hologram 21, as shown in FIG. 9, a surface (first surface) arranged at the collimating lens 4 side is a diffracting surface 21a having a convex power, and a surface (second surface) facing on the objective lens 6 is a refracting surface 21b having a concave power. The diffracting surface 21a has a diffracting structure 21c including a plurality of coaxial circular zones, and is configured to obtain a maximum diffraction efficiency at a wavelength of the semiconductor laser 1.

In the incident angle transforming hologram 21, as similar to the incident angle transforming lens 20 described in the first embodiment, when the diverged beam is entered into the incident angle transforming hologram 21, an inclination angle between a marginal ray of a diverged beam emitted from the hologram 21 and the optical axis is larger than an inclination angle between a marginal ray of an incident diverged beam to the hologram 21 and the optical axis. When the converged beam is entered into the incident angle transforming hologram 21, an inclination angle between a marginal ray of a converged beam emitted from the hologram 21 and the optical axis is larger than an inclination angle between a marginal ray of an incident converged beam to the hologram 21 and the optical axis.

More specifically, the incident angle transforming hologram 21 includes a function that further enlarges degrees of divergence/convergence of an incident beam to emit the beam, and has an effect of increasing a spherical aberration generated per unit moving distance of the collimating lens 4. Therefore, also in the incident angle transforming hologram 21, when the diameter of a beam entered into the incident angle transforming hologram 21 and the diameter of a beam emitted from the incident angle transforming hologram 21 are represented by D1 and D2, respectively, the relationship given by D1>D2 is satisfied.

Therefore, the incident angle transforming hologram 21 can obtain a similar effect as the above-described effect held by the incident angle transforming lens 20, i.e., can make the moving distance of the collimating lens 4 smaller than that of the related art to contribute to miniaturization of the optical head.

By a switching between a recording power and a reproducing power and a change in ambient temperature, the wavelength of the laser source varies. In this case, when the wavelength of the laser beam is shorter, an influence by a variation in optimum image point position which is caused by a variation of the refractive index of material of the objective lens with a variation in wavelength becomes larger. Therefore, in particular, a recording type optical head generally includes a chromatic aberration correcting function to correct the variation in optimum image point position by the variation in wavelength.

When a collimated beam having a reference wavelength of 408 nm of the semiconductor laser 1 is entered into the incident angle transforming hologram 21 according to the present embodiment, a convex diffracting power is equal to a concave refracting power, and the incident angle transforming hologram 21 functions as the afocal lens. However, when the wavelength of the laser beam becomes long, a diffraction angle on the diffracting surface 21a increases to strengthen the convex power. Thus the incident angle transforming hologram 21 functions as a lens which emits the converged beam when the collimated beam is entered into the hologram 21. On the other hand, when the wavelength of the laser beam becomes short, the diffraction angle on the diffracting surface 21a decreases to strengthen the concave power. Thus the incident angle transforming hologram 21 functions as a lens which emits the diverged beam when the collimated beam is entered into the hologram 21. This lens functions to offset the fluctuation in optimum image point position generated by the objective lens 6 and has an effect of so-called chromatic aberration correction. More specifically, the diffracting structure 21c formed on the diffracting surface 21a shows a chromatic aberration correcting function.

The diffracting structure 21c has the convex power serving as a condition to show the chromatic aberration correcting function. An amount of the convex power is an amount necessary to cancel the chromatic aberration generated by the objective lens 6. In the incident angle transforming hologram 21, as shown in FIG. 9, the surface arranged at the collimating lens 4 side is a flat surface, and the surface facing on the objective lens 6 is formed by a concave surface. If the diffracting structure 21c having the convex power is formed on the concave surface facing on the objective lens 6, the chromatic aberration correcting function by the diffracting structure 21c can be obtained. However, since the diameter D1 of the beam entered into the incident angle transforming hologram 21 is equal to the diameter D2 of the emitted beam, the effect of increasing degrees of divergence/convergence of the incident beam cannot be obtained. Therefore, in the shape of the incident angle transforming hologram 21 having one flat surface as shown in FIG. 9, the diffracting structure 21c must be formed on the flat surface arranged at the collimating lens 4 side. However, as will be described below, the shape of the degree-of-divergence/convergence enlarging member having the chromatic aberration correcting function is not limited to the shape of the incident angle transforming hologram 21.

As described above, since the optical head 11 according to the embodiment includes the incident angle transforming hologram 21, the movable range of the collimating lens 4 can be reduced, and the optical head having a compact size can be realized. Since the incident angle transforming hologram 21 also includes the chromatic aberration correcting function, the optical head having excellent recording or reproducing performance can be realized.

The incident angle transforming hologram 21 according to the present embodiment can be configured to have a thickness and a weight which are smaller than those of the incident angle transforming lens according to the first embodiment. For this reason, the incident angle transforming hologram 21 is characterized in that the incident angle transforming hologram 21 is more suitable for miniaturization and high-speed drive of the objective lens 6.

As described above, in the incident angle transforming hologram 21, the surface arranged to the collimating lens 4 side is formed as the flat surface, the surface facing on the objective lens 6 is formed as the concave surface, and the diffracting structure 21c which exerts the chromatic aberration correcting function is formed on the flat surface of the collimating lens 4 side. However, the degree-of-divergence/convergence enlarging member can also employ a shape to be described later. When the degree-of-divergence/convergence enlarging member employs the shape, the member has the chromatic aberration correcting function and can obtain a larger afocal magnification as the afocal lens.

As described above, the amount of the concave power generated by the diffracting structure 21c for obtaining the chromatic aberration correcting function is determined by the amount of the chromatic aberration generated by an objective lens to be used. For example, a chromatic aberration generated by the objective lens is 0.5 μm/nm, in order to make the amount of the chromatic aberration substantially zero, a convex power generated by the diffracting structure 21c formed on the degree-of-divergence/convergence enlarging member is almost uniquely determined. On the other hand, in order to reduce the moving distance of the collimating lens 4 to miniaturize the optical head, the convex power and the concave power in the degree-of-divergence/convergence enlarging member must be equal to each other to cause the degree-of-divergence/convergence enlarging member to function as the afocal lens. In this case, as in the example described above, in the case that the diffracting structure 21c which exerts the chromatic aberration correcting function is formed on the flat surface of the incident angle transforming hologram 21 arranged at the collimating lens 4 side, when the thickness of the incident angle transforming hologram 21 is set to about 1 mm, a diameter of a beam entered into the incident angle transforming hologram 21 and a diameter of a beam emitted from the incident angle transforming hologram 21 are represented by D1 and D2, respectively, a value of D2/D1 for canceling the chromatic aberration described above is about 0.95.

From the above viewpoint, the value of D2/D1 in the degree-of-divergence/convergence enlarging member is supposed to be determined by the amount of chromatic aberration to be corrected. However, when the degree-of-divergence/convergence enlarging member is formed as described below, the value of D2/D1 is appropriately set. Thus, the moving distance of the collimating lens 4 can be further reduced to make it possible to further miniaturize the optical head.

Figure 12:
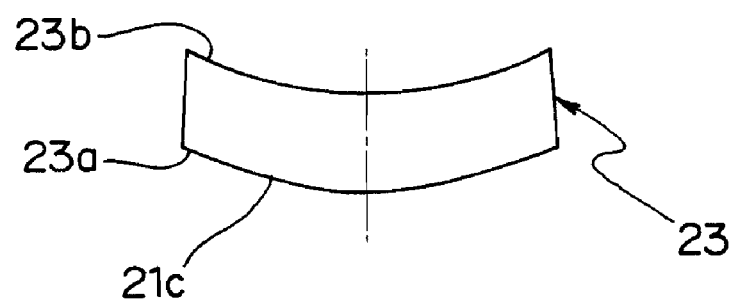
FIG. 12 is a diagram showing a modification of a degree-of-divergence/convergence enlarging member included in the optical head according to the second embodiment of the present invention.

More specifically, in order to further reduce the moving distance of the collimating lens 4 to further miniaturize the optical head, the value of D2/D1 must be further reduced. For example, in a case that a degree-of-divergence/convergence enlarging member having the value of D2/D1 smaller than the above value, for example, D2/D1=0.8 is to be formed, since the thickness of the incident angle transforming hologram 21 must be an actual value, as described above, an amount of the convex power generated by the diffracting structure 21c is almost uniquely determined when the amount of the chromatic aberration to be corrected is 0.5 μm/nm. Therefore, as shown in FIG. 12, the surface arranged to the collimating lens 4 side is formed to be a convex surface 23a so as to have a predetermined amount of convex power. Since the convex power and the concave power in the degree-of-divergence/convergence enlarging member must be equal to each other to cause the degree-of-divergence/convergence enlarging member to function as the afocal lens, the surface facing on the objective lens 6 is formed to be a concave surface 23b having an amount of concave power almost equal to an absolute value of an amount of power which is a sum of the convex power generated by the diffracting structure 21c and the convex power generated by the convex surface 23a. In this manner, a degree-of-divergence/convergence enlarging member 23 as shown in FIG. 12 is formed.

In the degree-of-divergence/convergence enlarging member 23, the diffracting structure 21c is formed on the convex surface 23a of the collimating lens 4 side. However, the diffracting structure 21c may be formed on any one of surfaces of the collimating lens 4 side and the objective lens 6 side. For example, in the example described above, when the diffracting structure 21c is formed on the surface of the objective lens 6 side, the surface of the objective lens 6 side has a convex power generated by the diffracting structure 21c. For this reason, the surface of the collimating lens 4 side is formed as the convex surface 23a having an amount of convex power which is almost equal to an absolute value of the amount of power obtained by adding the convex power generated by the diffracting structure 21c and the concave power generated by the concave surface 23b. More specifically, the shape of the degree-of-divergence/convergence enlarging member may be determined such that the degree-of-divergence/convergence enlarging member eventually functions as the afocal lens by a concave power generated by the concave surface, a convex power generated by the convex surface, and a convex power generated by the diffracting structure 21c in the degree-of-divergence/convergence enlarging member. In other words, the shape of the degree-of-divergence/convergence enlarging member may be determined such that the concave power and the convex power are equal to each other.

When the convex surface and the concave surface are compared with each other, an area of an effective region on the convex surface is larger than that on the concave surface. For this reason, from the viewpoint of manufacturing of the diffracting structure 21c, it is preferable to form the diffracting structure 21c on the convex surface because of the facility of manufacturing.

(Third Embodiment)

Another embodiment of the present invention will be described below with reference to FIGS. 10 and 11. The same reference numerals as in the first embodiment and the second embodiment denote the same configuration elements in the third embodiment, and a description thereof will be omitted.

Figure 10:
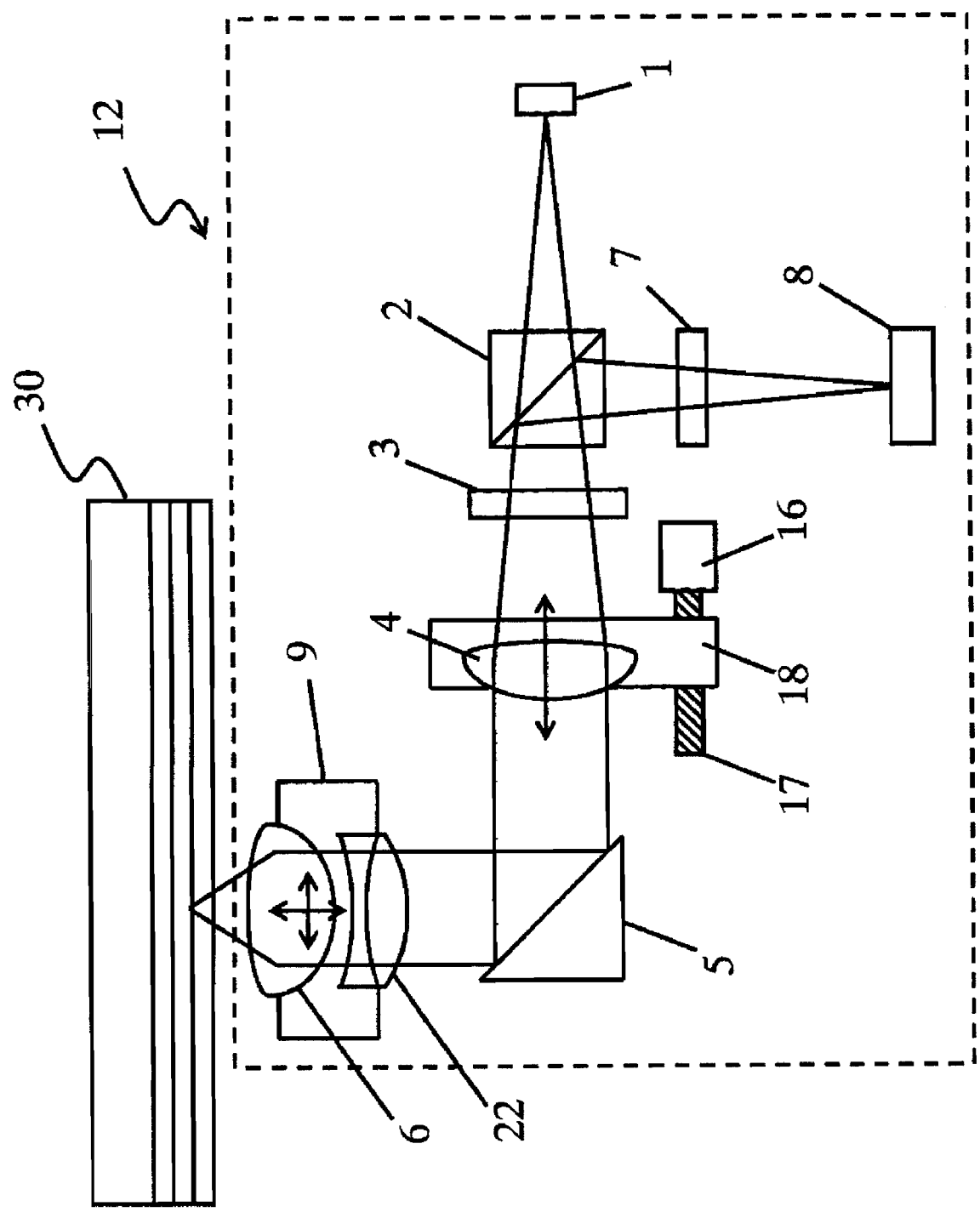
FIG. 10 is a schematic diagram of an optical head according to a third embodiment of the present invention.
Figure 11:
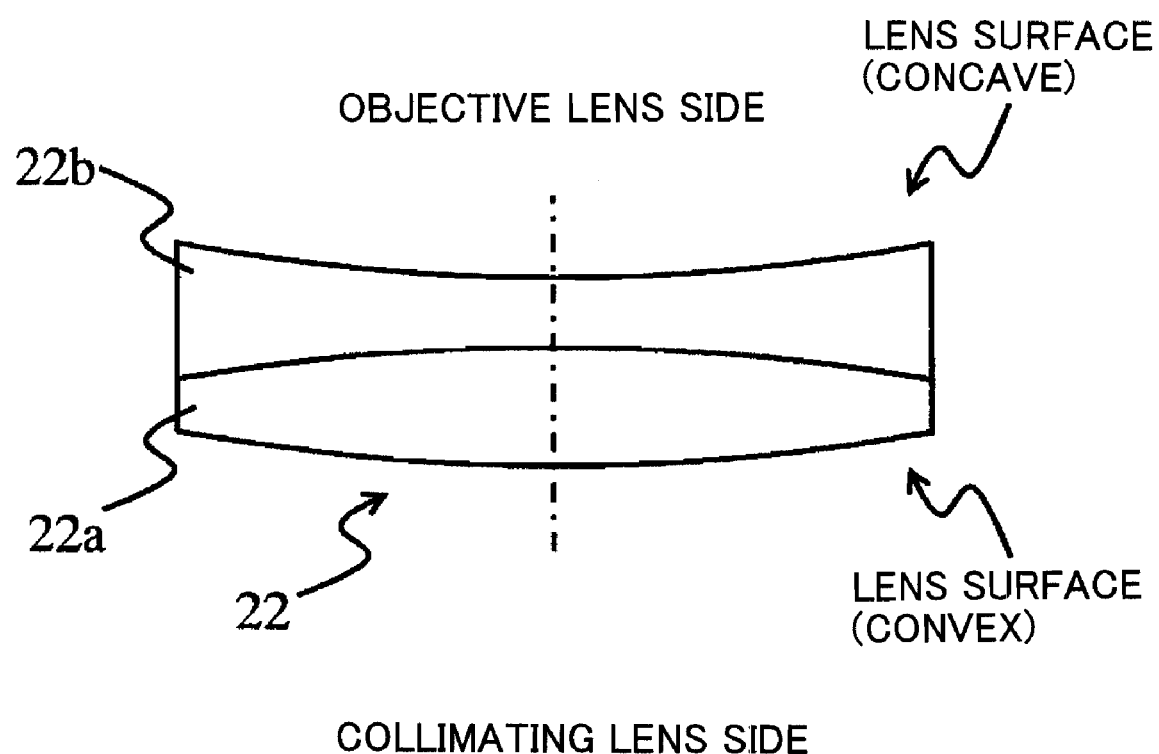
FIG. 11 is a schematic diagram showing a structure of an incident angle transforming compound lens in the optical head shown in FIG. 10.

FIG. 10 is a schematic diagram of an optical head according another embodiment of the present invention. In FIG. 10, reference numeral 1 denotes the semiconductor laser corresponding to an example of a light source; 2 denotes the polarizing beam splitter; 3 denotes the ¼ wave plate; 4 denotes the collimating lens corresponding to an example of a coupling lens; 5 denotes the reflecting mirror; 6 denotes the objective lens; 7 denotes the detecting lens; 8 denotes the light-receiving element; 9 denotes the biaxial actuator which drives the objective lens 6; 22 denotes an incident angle transforming compound lens corresponding to an example of the degree-of-divergence/convergence enlarging member; 16 denotes the stepping motor which drives the collimating lens 4; 17 denotes the screw shaft; 18 denotes the lens holder which holds the collimating lens 4. These components constitute an optical head 12. Reference numeral 30 denotes the optical disc having a plurality of the transparent substrates (the light-transmitting layers) and corresponding to the optical information recording medium. The inter-surface distance between the information recording surface 34 of the thickest light-transmitting layer and the information recording surface 31 of the thinnest light-transmitting layer exceeds the 30 μm mentioned before.

A difference between the optical head 10 according to the first embodiment, the optical head 11 according to the second embodiment, and the optical head 12 according to the third embodiment is the incident angle transforming compound lens 22. The incident angle transforming compound lens 22, as shown in FIG. 11, is formed by cementing a convex lens 22a (glass material: VC78, an Abbe number of 55) arranged at the collimating lens 4 side (incident side) and a concave lens 22b (glass material: FD15, an Abbe number of 30) arranged at the objective lens 6 side (emitting side) to each other.

Also in the incident angle transforming compound lens 22, when the diverged beam is entered into the lens 22, an inclination angle between a marginal ray of a diverged beam emitted from the lens 22 and the optical axis is larger than an inclination angle between a marginal ray of an incident diverged beam to the lens 22 and the optical axis. When a converged beam is entered into the lens 22, an inclination angle between a marginal ray of a converged beam emitted from the lens 22 and the optical axis is larger than an inclination angle between a marginal ray of an incident converged beam to the lens 22 and the optical axis.

More specifically, the incident angle transforming compound lens 22 has a function of further enlarging degrees of divergence/convergence of the incident beam to emit the beam and an effect of increasing a spherical aberration generated per unit moving distance of the collimating lens 4.

Therefore, when a diameter of a beam entered into the incident angle transforming compound lens 22 and a diameter of a beam emitted from the incident angle transforming compound lens 22 are represented by D1 and D2, respectively, the incident angle transforming compound lens 22 also has the relationship given by D1>D2.

Therefore, the incident angle transforming compound lens 22 can obtain a similar effect as the above-described effect held by the incident angle transforming lens 20, i.e., can make the moving distance of the collimating lens 4 smaller than that of the related art to contribute to miniaturization of the optical head.

When collimated beam having the reference wavelength of 408 nm of the semiconductor laser 1 are entered into the incident angle transforming compound lens 22 according to the present embodiment, a power of the convex lens 22a and a power of the concave lens 22b are equal to each other. Thus the incident angle transforming compound lens 22 functions as the afocal lens. However, when the wavelength of the laser beam becomes long, the power of the concave lens having a large dispersion (small Abbe number) becomes smaller. When the collimated beam is entered into the incident angle transforming compound lens 22, the incident angle transforming compound lens 22 functions as a lens which emits a converged beam. On the other hand, when the wavelength of the laser beam becomes short, the power of the concave lens having the large dispersion (small Abbe number) further increases. When the collimated beam is entered into the incident angle transforming compound lens 22, the incident angle transforming compound lens 22 functions as a lens which emits a diverged beam. This lens functions to offset the fluctuation in optimum image point position generated by the objective lens 6 and has the effect of so-called chromatic aberration correction.

In order to be given the chromatic aberration correcting function to the incident angle transforming compound lens 22, a condition in which dispersion of the glass material used in the concave lens 22b is larger than dispersion of the glass material used in the convex lens 22a must be satisfied. More specifically, a low dispersion material having the Abbe number of 50 or more is preferably used in the convex lens 22a, and a high dispersion material having the Abbe number of 35 or less is preferably used in the concave lens 22b.

As described above, since the optical head 12 according to the present embodiment includes the incident angle transforming compound lens 22, the movable range of the collimating lens 4 can be reduced, and the optical head having a compact size can be realized. Since the incident angle transforming compound lens 22 also includes the chromatic aberration correcting function, the optical head having excellent recording or reproducing performance can be realized.

In the first embodiment to third embodiment, the configuration of the optical head which reduces the movable range of the collimating lens 4 by using any one of the incident angle transforming lens 20, the incident angle transforming hologram 21, and the incident angle transforming compound lens 22, which are mounted on the movable part of the biaxial actuator 9, is described. The present invention is not limited to the embodiments 1 to 3.

More specifically, the present invention can be applied to an optical head including a degree-of-diversion/convergence enlarging member, wherein the degree-of-diversion/convergence enlarging member is fixed at a position between a collimating lens and an objective lens and has a function enlarging an inclination angle between a marginal ray of a beam emitted from the collimating lens and entered into the objective lens and an optical axis. For example, diffracting structures may be arranged on both a surface of incidence and an output surface of the degree-of-diversion/convergence enlarging member. Such degree-of-diversion/convergence enlarging member may be fixed on the optical head not on the biaxial actuator.

When a diameter of a beam entered into the degree-of-diversion/convergence enlarging member and a diameter of a beam emitted from the degree-of-diversion/convergence enlarging member are represented by D1 and D2, respectively, a condition in which the degree-of-diversion/convergence enlarging member has the function enlarging the inclination angle between the marginal ray of the beam emitted from the collimating lens and entered into the objective lens and the optical axis is given by:

$$D1 > D2.$$

When a difference between the incident beam diameter D1 and the emitted beam diameter D2 is small, an effect of enlarging the inclination angle is small. For this reason, the following condition is preferably satisfied:

$$D1 \times 0.99 \geq D2.$$

On the other hand, the smaller the emitting beam diameter D2 than the incident beam diameter D1, the more the effect of enlarging the inclination angle increases. However, in order to secure an interval (working distance) between the objective lens and the optical disc, a focal length of the objective lens must be secured to some extent. Thus an effective diameter of the objective lens cannot be considerably reduced. More specifically, when the incident beam diameter D1 is larger than the emitting beam diameter D2 of the degree-of-diversion/convergence enlarging member, the effective diameter and an outer diameter of the collimating lens 4 become large. Thus the entire optical system increases in size. Therefore, actually, the following condition is preferably satisfied:

$$D2 \geq D1 \times 0.8$$

As described above, the diameter D1 of the beam entered into the degree-of-diversion/convergence enlarging member and the diameter D2 of the beam emitted from the degree-of-diversion/convergence enlarging member preferably fall within the following range:

$$D1 \times 0.99 \geq D2 \geq D1 \times 0.8$$

Furthermore, it is apparent that the coupling lens driven to correct the spherical aberration is applied to not only the configuration in which the collimating lens 4 described in the first embodiment to third embodiment is driven in the optical axis direction by using the stepping motor 16, but also an optical element such as a so-called beam expander which changes the degree of diversion and/or the degree of convergence of a beam entered into the objective lens by changing, for example, an interval between two sets of lens groups in the optical axis direction.

(Fourth Embodiment)

As described in the first embodiment to third embodiment, a degree-of-diversion/convergence enlarging member such as the incident angle transforming lens 20 is arranged between the collimating lens 4 and the objective lens 6 to make it possible to reduce the moving distance of the collimating lens 4 and to miniaturize the optical head. On the other hand, as a method for reducing the moving distance of the collimating lens 4 without using the degree-of-diversion/convergence enlarging member, a method for increasing the focal length of the objective lens 6 is used.

However, since an objective lens 6 having a large focal length has a large diameter, such objective lens 6 hinders miniaturization of the optical head, and the objective lens increases in weight. Thus this configuration is disadvantageous for operation performance of the actuator which drives the objective lens or the like. Therefore, as described above, it is effective to arrange, for example, the degree-of-diversion/convergence enlarging member such as the incident angle transforming lens 20 from a viewpoint of the operation performance of the actuator which drives the objective lens or the like. In particular, as in the incident angle transforming hologram 21 or the incident angle transforming compound lens 22, when the chromatic aberration correcting function is given to the degree-of-diversion/convergence enlarging member, an optical element for correcting the chromatic aberration need not be arranged additionally. This is further advantageous.

Figure 13:
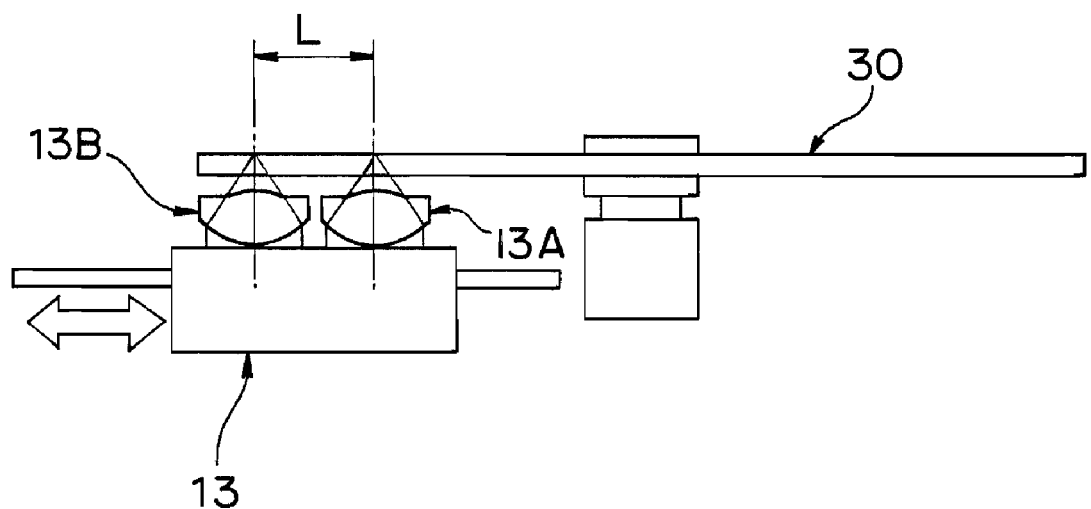
FIG. 13 is a 2-lens optical head according to a fourth embodiment of the present invention in which the optical head according to the first to third embodiments of the present invention and a CD/DVD optical head are integrated with each other.

Furthermore, as the fourth embodiment of the present invention, as shown in FIG. 13, a 2-lens optical head 13 can also be configured such that an optical head 13A for a CD (Compact Disc) and a DVD (Digital Versatile Disc) and an optical head 13B for a BD in the first to third embodiments described above are integrated with each other.

In the 2-lens optical head 13 shown in FIG. 13, the CD/DVD optical head 13A and the BD optical head 13B may be separately independently arranged and integrated with each other. For example, an actuator, which drives the objective lens included in the CD/DVD optical head 13A, and the objective lens 6 and the degree-of-diversion/convergence enlarging member included in the BD optical head 13B, is shared, so that the objective lens, the objective lens 6, and the degree-of-diversion/convergence enlarging member may be integrally driven by one movable part.

Figure 17:
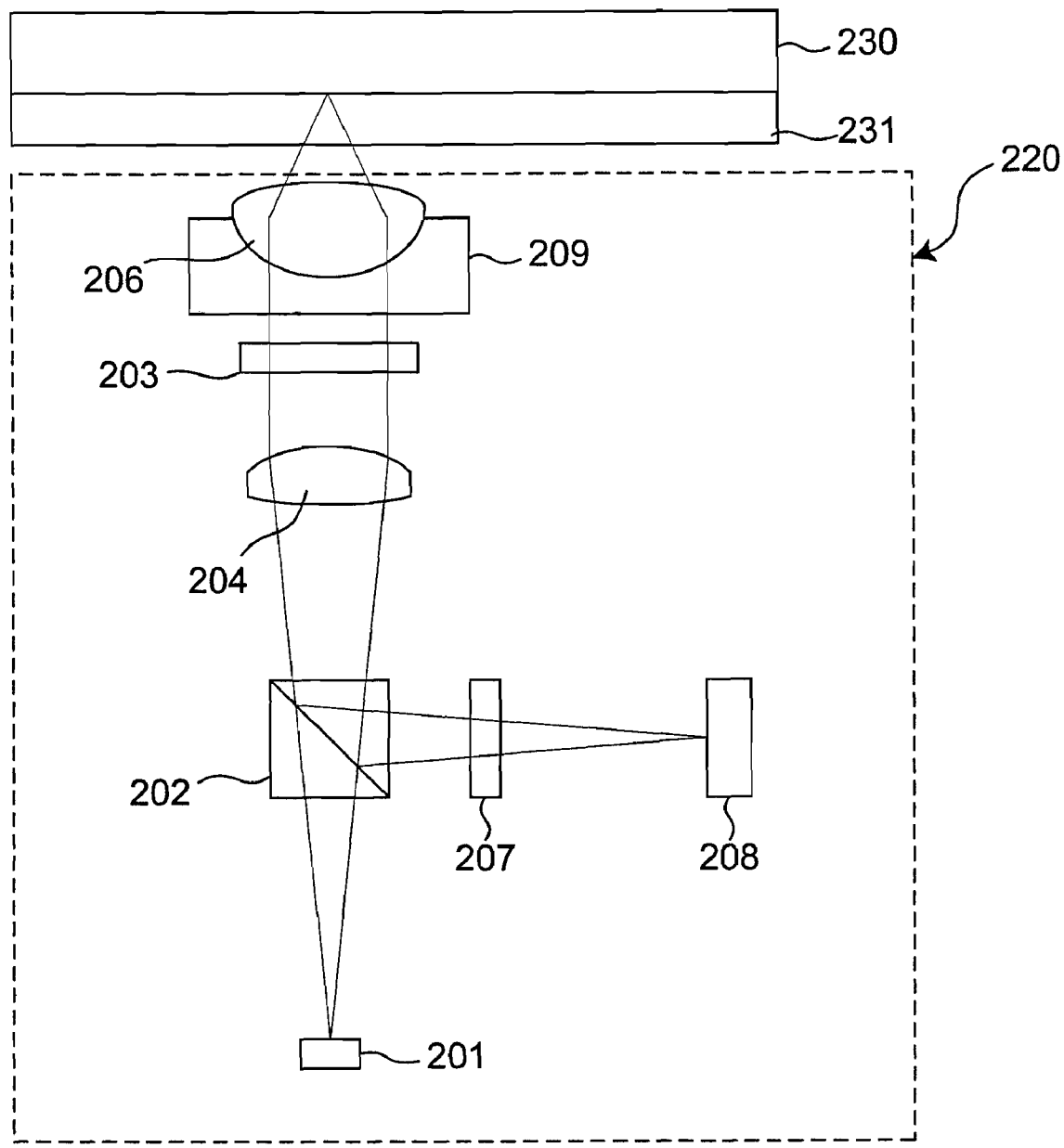
FIG. 17 is a diagram showing a configuration of the CD/DVD optical head shown in FIG. 13.
Figure 18:
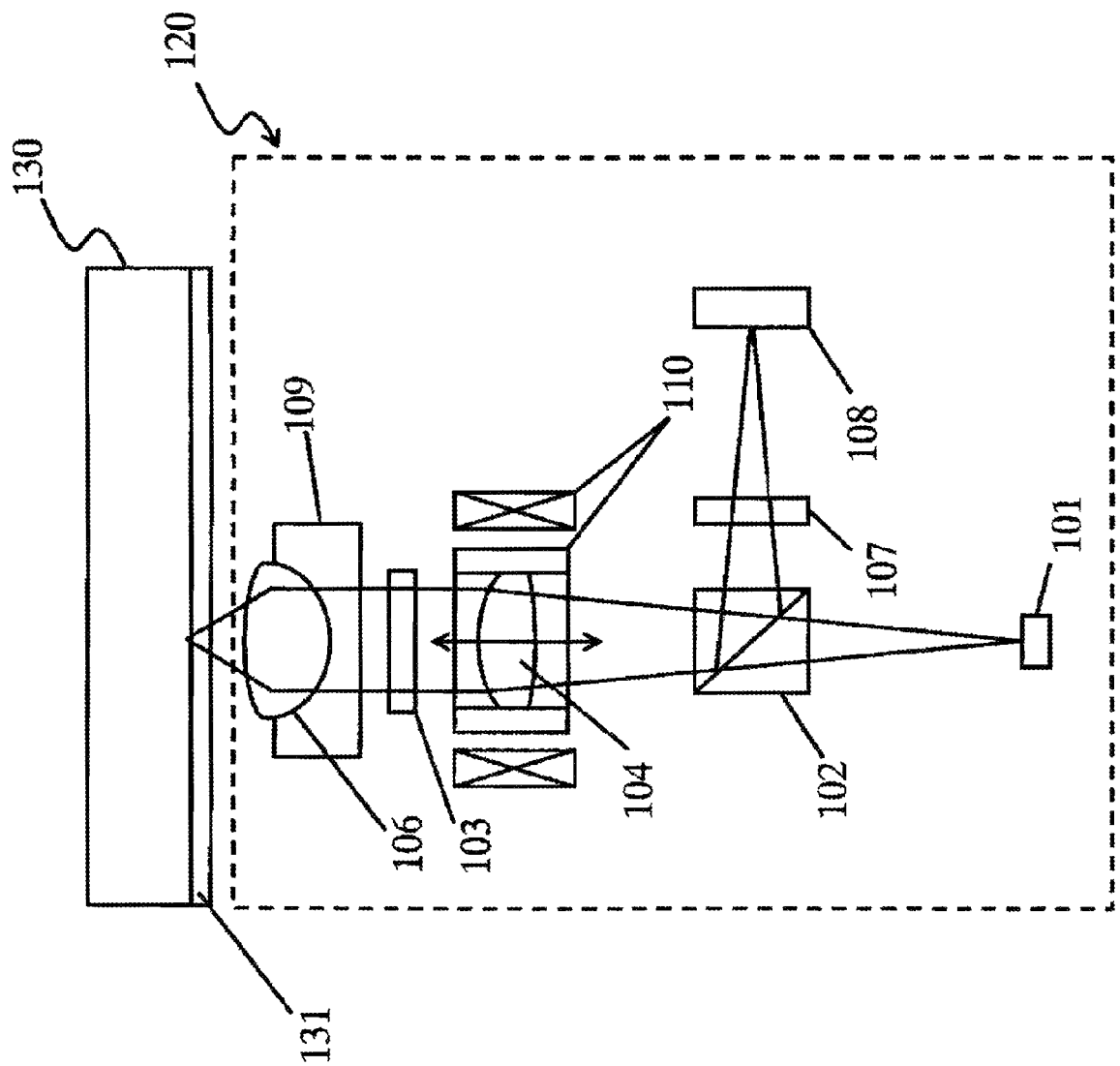
FIG. 18 is a schematic diagram of a conventional optical head.
Figure 19:
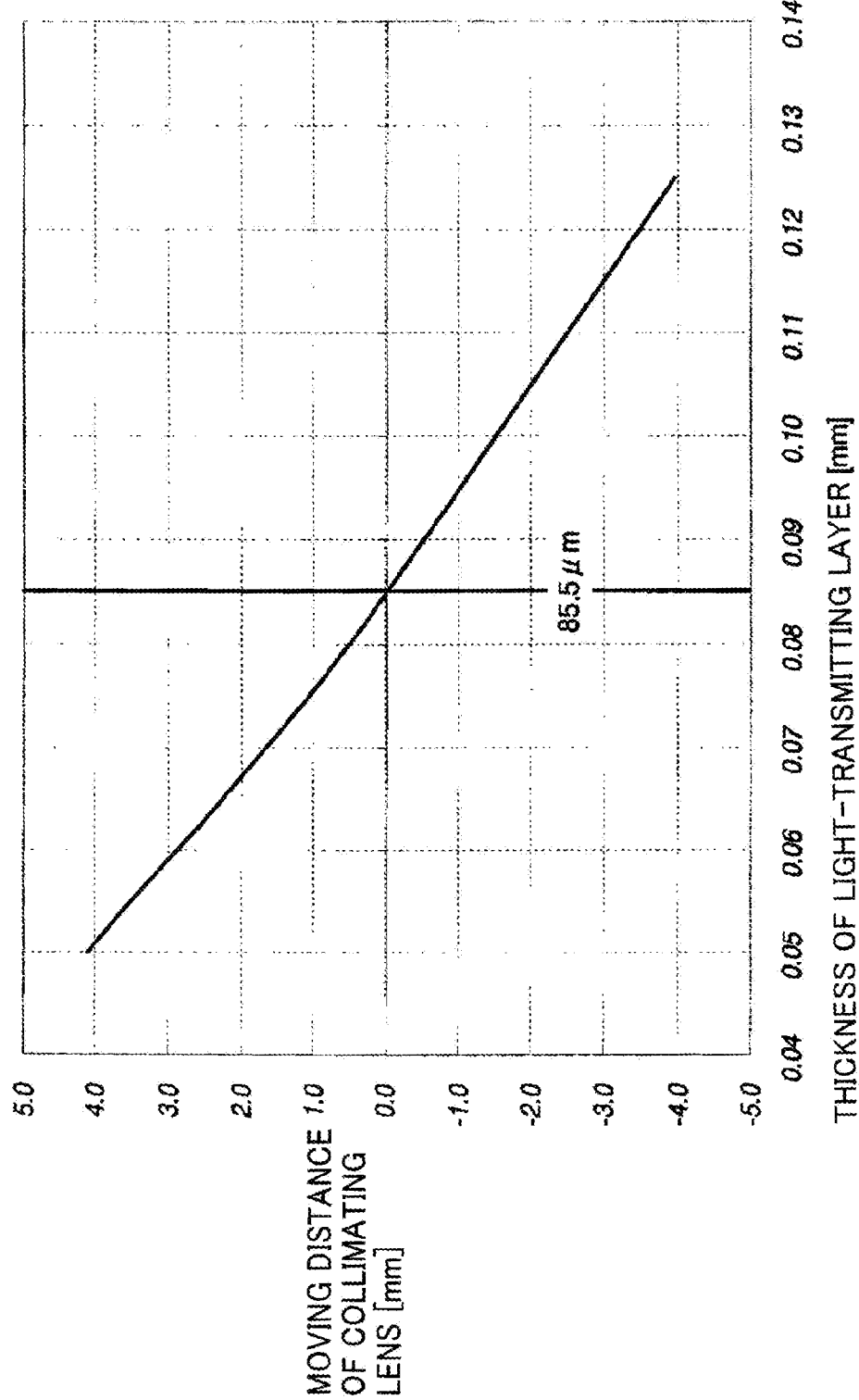
FIG. 19 is a diagram showing a relationship between a thickness of a light-transmitting layer and a moving distance of a collimating lens in the conventional optical head.

The CD/DVD optical head 13A shown in FIG. 13 can have a configuration of an optical head 220 shown in, for example, FIG. 17. In this case, an optical source 201 corresponds to a second light source, and an objective lens 206 corresponds to a second objective lens. Reference numeral 202 denotes a polarizing beam splitter; 203 denotes a ¼ wave plate; 204 denotes a collimating lens; 207 denotes a multi-lens; 208 denotes a light-receiving element; and 209 denotes a biaxial actuator which drives the objective lens 206. Reference numeral 230 denotes an optical disc, and reference numeral 231 denotes a light-transmitting layer.

In FIG. 13, in the 2-lens optical head 13, the optical head 13A is shown on the right, and the optical head 13B is shown on the left. However, this arrangement is only for the sake of convenience. The arrangement does not correspond to an actual arrangement, and the illustrated shapes, sizes, and the like are different from the actual shapes, sizes, and the like.

As described above, the 2-lens optical head can also be configured. However, for example in a 2-lens optical head 14 shown in FIGS. 14 and 15, which includes the objective lens having a large diameter to reduce a moving distance of the collimating lens in place of including the degree-of-diversion/convergence enlarging member such as the incident angle transforming lens 20, a following problem will be posed. More specifically, as described above, due to an increase in weight by the large objective lens, operation performance of the actuator for driving the objective lens is deteriorated. Furthermore, a center-to-center distance L1 between an objective lens 14A-1 in a CD/DVD optical head 14A and an objective lens 14B-1 in the BD optical head 14B is larger than a center-to-center distance L in the 2-lens optical head 13 shown in FIG. 13. Thus, as will be described below, a problem related to read/write of information from/on an optical disc, for example, tracking control or the like arises.

Figure 14:
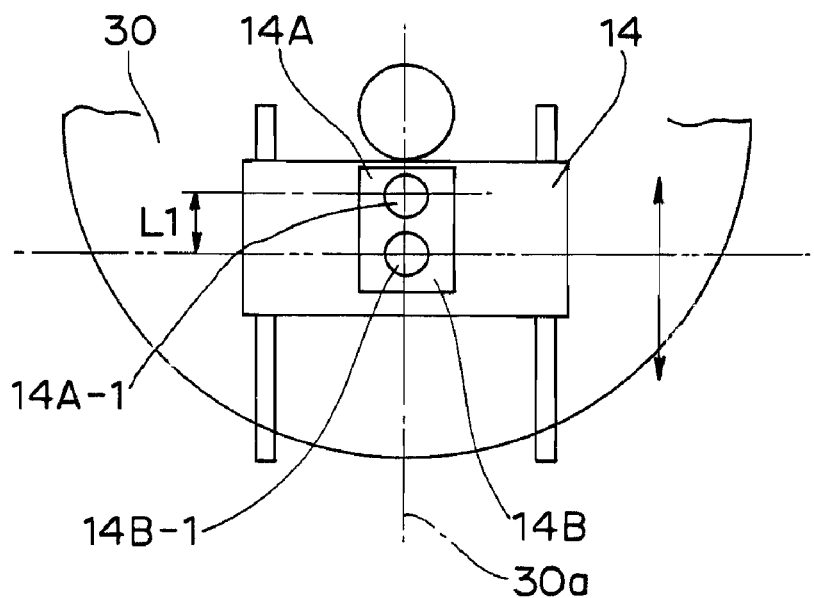
FIG. 14 is a diagram in which lenses in the 2-lens optical head are arranged along a seek centerline of an optical disc.
Figure 15:
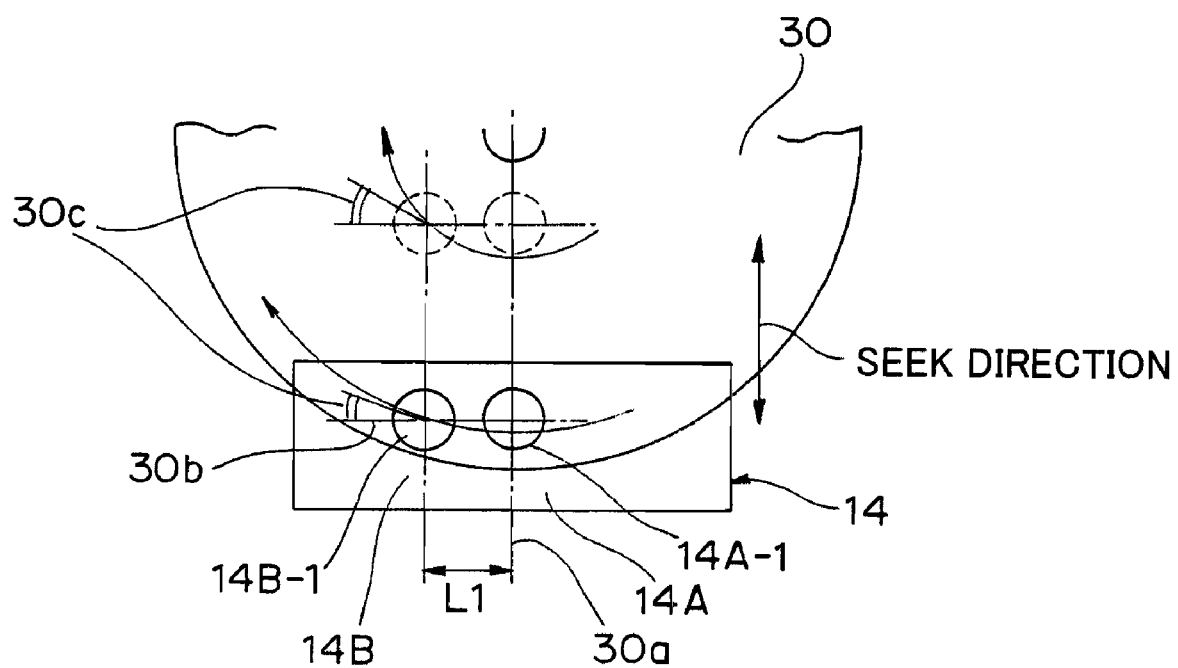
FIG. 15 is a diagram in which lenses in the 2-lens optical head are arranged in a tangential direction orthogonal to a seek center line of the optical disc.

In the 2-lens optical head 14, with respect to a method for arranging the objective lens 14A-1 in the CD/DVD optical head 14A and the objective lens 14B-1 in the BD optical head 14B, as shown in FIG. 14, a method for arranging the objective lens 14A-1 and the objective lens 14B-1 side by side along a seek center line 30a of the optical disc 30 and, as shown in FIG. 15, a method for arranging the objective lens 14A-1 on the seek center line 30a of the optical disc 30 and arranging the objective lens 14B-1 on a tangential direction 30b orthogonal to the seek center line 30a are known. In an arranging method shown in FIG. 14, due to the large center-to-center distance L1, the 2-lens optical head 14 increases in size. Therefore, for example, when the BD optical head 14B moves to access inner-circumference tracks of the optical disc 30, the CD/DVD optical head 14A may interfere with a motor for rotating the optical disc. In the arranging method shown in FIG. 15, due to the large center-to-center distance L1, a displacement of the objective lens 14B-1 from the seek center line 30a becomes large. On the other hand, curvatures of tracks of the optical disc 30 are relatively moderate at the outer circumference side, and the curvatures are tight on the inner circumference side. Therefore, a track angle 30c obtained when the BD optical head 14B having the objective lens 14B-1 accesses to the outer-circumference tracks is different from the track angle 30c obtained when the BD optical head 14B accesses the inner-circumference tracks. Due to the resultant differences of the track angle 30c, a beam pattern detected by a photodetector included in the BD optical head 14B changes. For this reason, tracking performance is disadvantageously deteriorated.

As described above, for example, according to installing the degree-of-diversion/convergence enlarging member such as the incident angle transforming lens 20, the moving distance of the collimating lens 4 can be reduced, the optical head can be miniaturized, and the diameter of the objective lens 6 need not be increased. Therefore, in the 2-lens optical head 13 including the BD optical head 13B in the first to third embodiments, the center-to-center distance L can be made equal to or smaller than that of a conventional optical head. Therefore, the problems described with reference to FIGS. 14 and 15 are not posed in the optical head according to this embodiment. In this manner, it is effective to install, for example, the degree-of-diversion/convergence enlarging member such as the incident angle transforming lens 20 from a viewpoint of reading/writing of information from/on an optical disc, for example, tracking control or the like.

(Fifth Embodiment)

Figure 16:
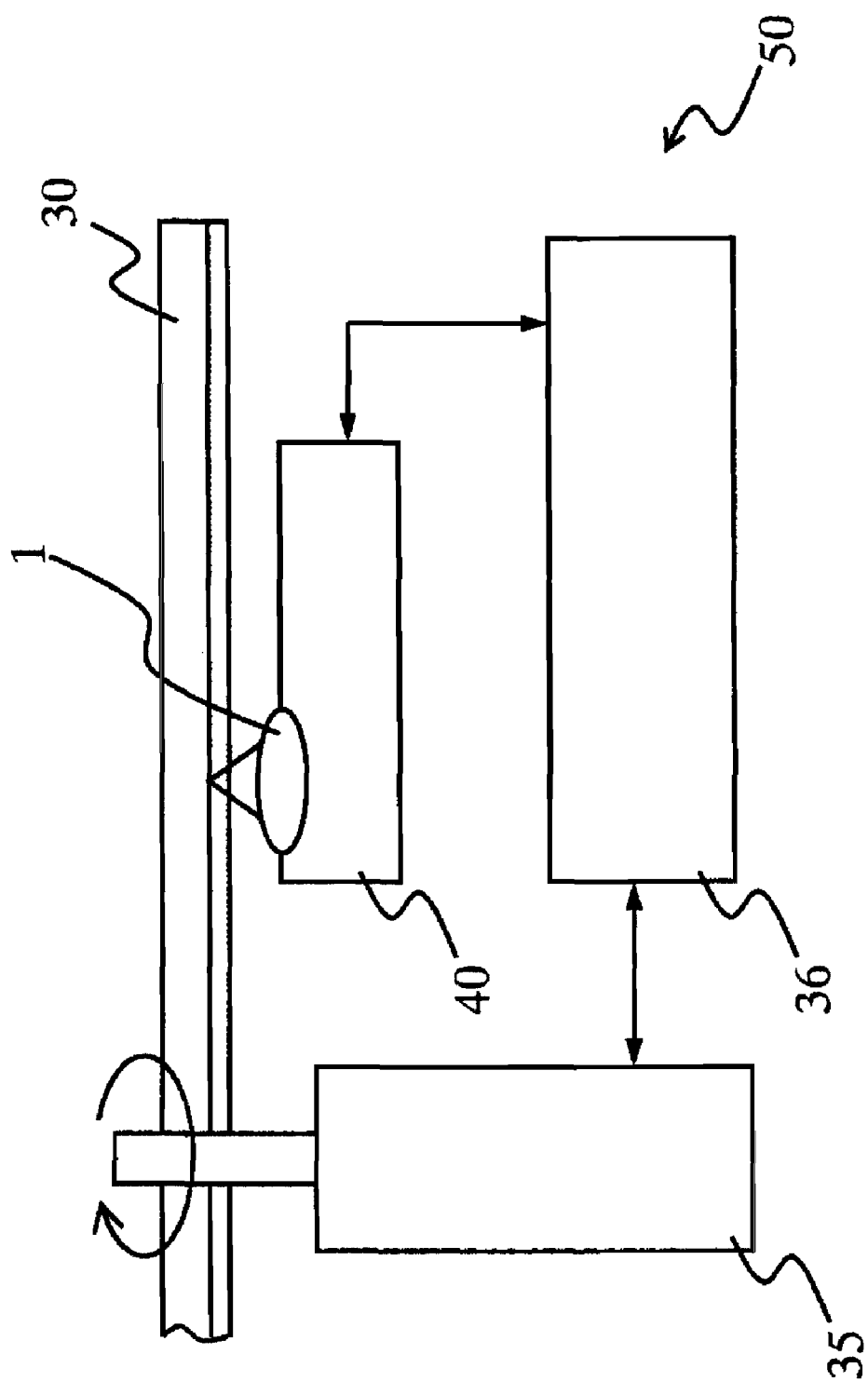
FIG. 16 is a schematic diagram of an optical disc device according to a fifth embodiment of the present invention.

FIG. 16 is a schematic diagram of an optical disc device according to one embodiment of the present invention.

In FIG. 16, reference numeral 50 denotes an entire optical disc device. Inside the optical disc device 50, an optical disc drive unit 35, a control unit 36, and an optical head 40 are arranged. Reference numeral 30 denotes an optical disc having a transparent substrate.

The optical disc drive unit 35 has a function for rotationally driving the optical disc 30, and the optical head 40 is any one of the optical heads described in the first embodiment to fourth embodiment. The control unit 36 has a function of driving and controlling the optical disc drive unit 35 and the optical head 40, a function of performing signal processing of a control signal and an information signal received by the optical head 40, and a function of interfacing the information signal the outside and the inside of the optical disc device 50.

In the optical disc device 50, any one of the optical heads described in the first embodiment to thirty fourth embodiment is mounted, and the moving range of the collimating lens is shortened. For this reason, the optical disc device 50 according to this embodiment has an excellent effect that a further compact size can be obtained even when the device 50 is used for an optical disc in which the thicknesses of the light-transmitting layers largely change by multilayering information recording surfaces. In particular, when any one of the optical heads described in the second embodiment and the third embodiment is used, in addition to an effect that the moving range of the collimating lens is reduced, a chromatic aberration correcting function is provided. For this reason, the optical disc device 50 of this embodiment can achieve a conspicuous effect of obtaining excellent recording or reproducing performance in addition to a effect of obtaining a compact size.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2006-076315 filed on Mar. 20, 2006, including specification, claims, drawings, and abstract are incorporated herein by reference in its entirety.

Industrial Applicability

Even though an optical head according to the present invention is used in an optical disc in which light-transmitting layers change in thickness by multilayering information recording surfaces, the optical head can be compactly configured and includes a chromatic aberration correcting function. For this reason, reductions in size and weight and an increase in precision of an optical disc device can be achieved, and a high-performance optical disc device can be provided at low cost.

The invention claimed is:

1. An optical head comprising:
a light source;
a coupling lens configured to make at least one of a degree of divergence and a degree of convergence of a light beam emitted from the light source variable;
an objective lens configured to focus the light beam on an optical information recording medium having at least three information recording surfaces at which light-transmitting layers have different thicknesses; and
a degree-of-divergence/convergence enlarging member formed by a single lens consisting of one component and configured to be fixed between the coupling lens and the objective lens,
wherein a diameter D1 of the light beam entering into the degree-of-divergence/convergence enlarging member and a diameter D2 of the light beam emitted from the degree-of-divergence/convergence enlarging member satisfy the following equation (1):

$$D1 > D2 \qquad (1),$$

wherein the degree-of-divergence/convergence enlarging member is an afocal lens in which the light beam emitted from the degree-of-divergence/convergence enlarging member becomes nearly a collimated beam when an incident beam to the degree-of-divergence/convergence enlarging member is nearly collimated beams, wherein, in the at least three information recording surfaces of the optical information recording medium, an inter-surface distance between an information recording surface of a thickest light-transmitting layer and an information recording surface of a thinnest light-transmitting layer exceeds 30 μm, wherein the degree-of-divergence/convergence enlarging member is fixed to a moving part of an actuator which drives the objective lens, and is driven integrally with the objective lens, wherein the degree-of-divergence/convergence enlarging member includes a chromatic aberration correcting function configured to correct a chromatic aberration of the objective lens generated as a result of a fluctuation in a wavelength of the light source, and wherein, in the degree-of-divergence/convergence enlarging member, a surface facing the coupling lens is a diffracting surface having a positive power and a surface facing the objective lens is a refracting surface having a negative power.

2. The optical head according to claim 1, wherein the diameter D1 of the light beam entering into the degree-of-divergence/convergence enlarging member and the diameter D2 of the light beam emitted from the degree-of-divergence/convergence enlarging member satisfy the following equation (5):

$$D1 \times 0.99 \geq D2 \geq D1 \times 0.8 \qquad (5).$$

3. The optical head according to claim 1, further comprising a drive means configured to move the coupling lens in an optical axis direction, wherein a position of the coupling lens in the optical axis direction is changed to change at least one of the degree of divergence and the degree of convergence of the light beam emitted from the light source.

4. The optical head according to claim 1, further comprising:

a second light source configured to be disposed independently of the light source; and a second objective lens configured to be arranged to be adjacent to the objective lens and focus a light beam emitted from the second light source on a second optical information recording medium different from the optical information recording medium.

5. The optical head according to claim 4, wherein the second objective lens is fixed to the moving part of the actuator driving the objective lens, and is driven integrally with the objective lens.

6. An optical disc device comprising:

the optical head according to in claim 1;

an optical disc drive unit configured to rotationally drive an optical disc; and a control unit configured to control the optical head and the optical disc drive unit.

* * * * *